United States Patent
Gonzalez-Banos et al.

(10) Patent No.: US 6,917,855 B2
(45) Date of Patent: Jul. 12, 2005

(54) REAL-TIME TARGET TRACKING OF AN UNPREDICTABLE TARGET AMID UNKNOWN OBSTACLES

(75) Inventors: Hector Gonzalez-Banos, Mountain View, CA (US); Cheng-Yu Lee, Stanford, CA (US); Jean-Claude Latombe, Stanford, CA (US)

(73) Assignees: Honda Motor Co., Ltd., Tokyo (JP); The Board of Trustees of the Leland Stanford Junior University, Stanford, CA (US)

( * ) Notice: Subject to any disclaimer, the term of this patent is extended or adjusted under 35 U.S.C. 154(b) by 203 days.

(21) Appl. No.: 10/435,934

(22) Filed: May 12, 2003

(65) Prior Publication Data
US 2004/0073368 A1 Apr. 15, 2004

Related U.S. Application Data
(60) Provisional application No. 60/378,015, filed on May 10, 2002.

(51) Int. Cl.[7] ............................................. G06F 19/00
(52) U.S. Cl. ...................... 700/245; 700/255; 700/259; 700/262; 318/568.11; 318/568.13; 901/48; 901/9; 901/15; 701/207; 701/301
(58) Field of Search .......................... 700/245, 45, 254, 700/63, 262, 255, 259; 318/568.11, 568.13; 901/9, 48, 15; 701/207, 301

(56) References Cited

U.S. PATENT DOCUMENTS

| | | | | |
|---|---|---|---|---|
| 4,627,511 A | * | 12/1986 | Yajima | 180/167 |
| 4,747,458 A | | 5/1988 | Andre et al. | |
| 4,761,595 A | * | 8/1988 | Goor | 318/568.1 |
| 4,980,626 A | * | 12/1990 | Hess et al. | 318/568.16 |
| 5,006,999 A | * | 4/1991 | Kuno et al. | 700/253 |
| 5,416,713 A | * | 5/1995 | Kameda et al. | 701/301 |
| 5,506,682 A | * | 4/1996 | Pryor | 356/623 |
| 5,999,881 A | * | 12/1999 | Law et al. | 701/301 |
| 6,201,231 B1 | * | 3/2001 | Regensburger et al. | 250/203.6 |
| 6,442,476 B1 | * | 8/2002 | Poropat | 701/207 |
| 6,463,356 B1 | * | 10/2002 | Hattori et al. | 700/245 |
| 2002/0022927 A1 | | 2/2002 | Lemelson et al. | |

FOREIGN PATENT DOCUMENTS

WO   PCT/US03/14809    11/2003

OTHER PUBLICATIONS

Mehlhorn, K., Naher, S., Leda: A Platform of Combinatorial and Geometric Computing, 1999, pp. 637–656, Cambridge University Press, Cambridge UK.

(Continued)

*Primary Examiner*—Gary Chin
*Assistant Examiner*—McDieunel Marc
(74) *Attorney, Agent, or Firm*—Fenwick & West LLP; Mark Duell

(57) ABSTRACT

Embodiments provide a strategy for computing the motions of a mobile robot operating in an obstacle-laden environment without requiring prior knowledge of the distribution of obstacles in the environment or knowing the trajectory of a target tracked by the robot. Embodiments provide an algorithm that governs the motion of the observer robot based on measurements of the target's position and the location of obstacles in the environment. The algorithm computes a description of the geometric arrangement between the target and the observer's visibility region produced by the obstacles and computes a continuous control rule using this description. Embodiments employ an escape-path tree data structure to categorize the target's possible modes of escaping from the observer robot's sensors and use the escape-path tree to determine the target's shortest escape path.

27 Claims, 13 Drawing Sheets

OTHER PUBLICATIONS

C. Becker et al., "An Intelligent Observer," in *Proc 4th International Symposium on Experimental Robotics,* 1995, Springer, pp. 153–160.

H. Choset, "Topological Simultaneous Localization and Mapping (SLAM): Toward Exact Localization Without Explicit Localization," *IEEE,* 2001, pp. 125–137.

C. B. Congdon et al., "CARMEL vs. Flakey: A Comparison of Two Robots," Internet, Draft Jan. 1994, pp. 1–52.

P. Fabiani and J.C. Latombe, Dealing with Geometric Constraints in Game–Theoretic Planning, in *Proc Int. Joint Conf. On Artif. Intell.,* 1999, pp. 942–947.

P. Fabiani et al., "Tracking a Partially Predictable Target with Uncertainties and Visibility Constraints," *Preprint submitted to Elsevier Preprint,* Nov. 15, 2000, pp. 1–24.

H. González–Banos, "Motion Strategies for Autonomous Observers," Ph.D. Thesis, Stanford University, Mar. 2001.

H. González–Banos et al., "The Autonomous Observer: A Tool for Remote Experimentation in Robotics," *Telemanipulator and Telepresence Technologies VI,* Matthew Stein, Ed., Sep. 1999, vol. 3840, SPIE Proc., pp. 210–221.

H. González–Banos et al., "Planning Robot Motion Strategies for Efficient Model Construction," *Robotics Research—the Ninth Int. Symp.,* J. Hollerbach and D. Koditschek, Eds., Salt Lake City, UT, 1999, Springer–Berlag, pp. 345–352.

H. González–Banos and J.C. Latombe, "Robot Navigation for Automatic Model Construction Using Safe Regions," *Lecture Notes in Control and Information Sciences,* 271, D. Russ and S. Singh, Eds. 2001, pp. 405–415.

L. J. Guibas et al., "A Visibility–Based Pursuit–Evasion Problem," *Int. J. of Computational Geometry and Applications,* vol. 9, Nos. 4&5, 1999, pp. 471–493.

S. Hutchinson et al., "A Tutorial on Visual Servo Control," *IEEE Trans. Robotics and Automation,* vol. 12, No. 5, Oct. 1996, pp. 651–670.

D. P. Huttenlocher et al., "Tracking Non–Rigid Objects in Complex Scenes," IEEE, *Proc. 4th Int. Conf. on Computer Vision,* 1993, pp. 93–101.

I. Ishiguro et al., "Robovie: A Robot Generates Episode Chains in our Daily Life," *Proc. Of the 32nd International Symp. Of Robotics,* Apr. 2001, 6 pp.

S. M. LaValle, "A Game–Theoretic Framework for Robot Motion Planning," Ph. D. Thesis, University of Illinois, Urbana, IL, Jul. 1995.

S. M. LaValle et al., "Motion Strategies for Maintaining Visibility of Moving Target," *Proc. 1997 IEEE Int'l. Conf. On Robotics and Automation,* Apr. 1997, pp. 731–736.

H. Li et al., "An Embedded System for Autonomous Collision Avoidance and Line Tracking Using Artificial CMOS Retina Sensor," *IEEE, Intelligent Vehicles Sumposium,* 2000, pp. 279–283.

T. Y. Li et al., "Automatically Generating Virtual Guided Tours," *Proc. Of the 1999 Computer Animation Conference,* May 1999, pp. 99–106.

P. Ögren and N. Leonard, "A Provably Convergent Dynamic Window Approach Obstacle Avoidance," Internet, 2001, pp. 1–6.

N. P. Papanikolopoulos et al., "Visual Tracking of a Moving Target by a Camera Mounted on a Robot: A Combination of Control and Vision," *IEEE Trans. On Robotics and Automation,* vol. 9, No. 1, Feb. 1993, pp. 14–35.

T. Shermer, "Recent Results in Art Galleries," *Proc. IEEE,* vol. 80, No. 9, Sep. 1992, pp. 1384–1399.

O'Rourke, J., "Visibility," Handbook of Discrete and Computational, Geometry, 1997, pp. 467–479, CRC Press, Boca Raton, FL, USA.

Slotine, J.J.–E., Li, Weiping, Applied Linear Control, 1991, pp. 283–284, Prentice–Hall, Inc., Englewood Cliffs, NJ, USA.

\* cited by examiner

US 6,917,855 B2

REAL-TIME TARGET TRACKING OF AN UNPREDICTABLE TARGET AMID UNKNOWN OBSTACLES

CROSS-REFERENCE TO RELATED APPLICATION

This application claims the benefit under 35 U.S.C. § 119(e) of U.S. Provisional Application No. 60/378,015, filed May 10, 2002. The above application is incorporated by reference in its entirety.

FIELD OF INVENTION

The present invention relates to robotic systems having a target tracking capability. More specifically, the present invention relates to a target tracking algorithm that provides, among other things, real-time tracking of an unpredictable target located amid unknown obstacles.

BACKGROUND OF THE INVENTION

Tracking moving targets, even with a mobile observer robot, raises numerous challenges. These challenges become increasingly difficult to solve when the moving target's trajectory is unknown and the mobile observer robot has no prior knowledge of the workspace through which it and the target are moving.

FIG. 1 illustrates an observer robot 103 following a moving target 101 through a workspace 100. The observer robot 103 includes a sensor that provides it with a localized visibility region 109 of the workspace 100. The observer robot 103 has no prior knowledge of the workspace 100 or the target's trajectory. Accordingly, the observer robot 103 wants to keep the target 101 within the visibility region 109 in order to track changes in the target's movement. Complicating the observer robot's task are various obstacles 105, 111 and occlusions produced by those obstacles. If the target 101 interposes one of these obstacles 105, 111 or an occlusion between itself and the observer robot 103, then the observer robot 103 will not be able to identify the target 103 in the visibility region 109 and will likely lose track of the target 101 altogether. While the workspace 100 is shown in FIG. 1 as a bounded area, the workspace 100 is theoretically unbounded.

FIG. 2 illustrates a problem that arises when the tracking algorithm used by the observer robot 103 employs only visual servoing to follow the target 101. Sensors associated with the observer robot produce visibility regions 109a–109c. The observer robot 103 identifies the target 101 in each of the visibility regions 109a–109c and moves progressively from location 103a to location 103c as the target moves from location 101a to 101c. However, as the target 101 approaches an edge of obstacle 111, the target's trajectory passes behind the edge to location 101d. From visibility region 109d, the observer robot 103 will not be able to identify the target 101 due to the edge of obstacle 111. Accordingly, the observer robot's visual servoing control will not know what steering command to next render to the observer robot 103. Thus, the observer robot 103 will likely lose track of the target 101 unless the target's trajectory just happens to take it past the interposing obstacle 111.

The tracking problem presented in FIG. 2 somewhat resembles the problem that a large hauling truck faces while trying to round a corner without passing over the curb of the near-side street. However, in the example provided in FIG. 2, the observer robot 103 cannot see through the obstacle 111 and cannot pass over it either. Accordingly, pure visual servoing does not provide an appropriate solution for workspaces like the workspace 100.

Tracking problems have been encountered in various other disciplines. However, avoiding occlusions are not typically a concern of the tracking solution. For instance, missile control systems do not typically need to solve occlusion problems. Similarly, tracking targets through obstacles in known environments is not typically a major problem. If the observer robot has a priori knowledge of the workspace, it can react to trajectories selected by the target. For instance, the prior art includes solutions to problems known as "guarding the art gallery" in which a target having an unknown trajectory moves through a workspace (e.g., an art gallery) similar to that shown in FIG. 1. In this problem, fixed sensors at various locations in the workspace are used to track the moving target. In this problem's formulation, the fixed sensors typically have knowledge of the workspace and knowledge about the location of the other fixed sensors. Similarly, if the observer robot has a prior knowledge of the target's trajectory, it can plan for the target's movements and is less reliant upon sensor data. Prior knowledge even allows solutions to be developed off-line and even outside the observer robot using more powerful computing devices than those likely to be available in a small robot.

Similarly, on-line game-theoretic planning solutions involve preparing probabilistic models of a target's behavior and typically include prior knowledge of the workspace. However, such solutions are typically computationally intense and may not be suitable for implementation in many robotic applications.

Accordingly, a solution is needed for the problem of tracking targets having unknown trajectories through an unknown workspace by a mobile observer robot. The solution should be sufficiently elegant so as to minimize the impact on the computational resources of the mobile observer robot.

SUMMARY OF THE INVENTION

Embodiments of the invention provide a strategy for computing the motions of an observer robot tracking a target in an unknown environment and with no prior knowledge of the target's intentions or the distribution of obstacles in the environment. Embodiments of the invention provide an algorithm that governs the motion of the observer robot based on measurements of the target's position and the location of obstacles in the environment. The algorithm computes a description of the geometric arrangement between the target and the observer's visibility region produced by the obstacles and computes a continuous control rule using this description.

Embodiments of the invention provide a method for tracking a target moving among a plurality of obstacles in a workspace. The method calls for preparing a visibility region that identifies the locations of obstacles from the plurality of obstacles and identifies the location of the target using data received from a sensor. A plurality of escape paths for the target are calculated using the visibility region, each escape path representing a route that would occlude the target from future detection by the sensor. An escape path set from among the plurality of escape paths is identified such that the escape path set represents escape routes having the shortest length. An escape risk gradient is calculated for the escape path set that can be used to prepare a steering command for an observer robot tracking the target.

Embodiments of the invention also provide a system for tracking a target moving among a plurality of obstacles in a workspace. The system includes a visibility acquisition module configured to prepare a visibility region that identifies locations of obstacles from the plurality of obstacles using data received from a sensor. A target acquisition module is configured to locate the target in the visibility region. An escape-path tree building module identifies a plurality of escape paths for the target using the visibility region, each escape path representing a route that would occlude the target from further detection by the sensor. A shortest escape-path tree calculation module is configured to identify an escape path set from among the plurality of escape paths such that the escape path set represents the routes having the shortest length. A risk gradient calculation module calculates an escape risk gradient for the escape path set that can be provided to an observer robot tracking the target.

Embodiments of the invention further provide a method for tracking a target in a workspace. The method calls for sensing the workspace to obtain a visibility region that identifies the target and at least one obstacle. An escape risk is calculated from the visibility region, the escape risk representing the risk that a trajectory of the target will escape further detection from an observer robot. Escape from the observer robot includes movement outside the visibility region and movement into an occlusion produced by the at least one obstacle. A steering command for the observer robot can be composed using the escape risk. The steering command reduces the target's ability to escape detection from the observer robot.

Embodiments of the invention also provide a system for tracking a target in a workspace. A sensor obtains data that describes the workspace. A visibility region acquisition module uses data received from the sensor to produce a visibility region that identifies a plurality of obstacles in the workspace. A target acquisition module is configured to identify the target in the workspace. A risk association module uses the visibility region to determine an escape risk that the target will escape detection from an observer robot, where escape from the observer robot includes both target movement outside the visibility region and target movement into an occlusion produced by at least one obstacle of the plurality of obstacles. A motion command calculation module composes a steering command for the observer robot that reduces a target's ability to escape detection from the observer robot.

Embodiments of the invention further provide a method for tracking a target moving in a workspace. The method calls for preparing an escape-path tree having the target as a head node. A plurality of escape paths are identified for the target, each escape path representing a route through the workspace that would occlude the target from at least one sensor. Each escape path of the plurality of escape paths is placed as a child node in the escape-path tree, and each escape path is ordered in the escape-path tree such that escape paths having shorter lengths reside higher in the escape-path tree than escape paths having longer lengths. A set of escape paths having shorter lengths is selected from the escape-path tree. An escape risk for the target is calculated using the set of escape paths.

Embodiments of the invention also provide a system for tracking a target moving in a workspace. An escape-path tree building module is configured to prepare an escape-path tree having the target as a head node and identify a plurality of escape paths for the target, where each escape path represents a route through the workspace that would occlude the target from at least one sensor. The building module is also configured to place each escape path of the plurality of escape paths as a child node in the escape-path tree and order the escape paths in the tree such that escape paths having shorter lengths reside higher in the escape-path tree than escape paths having longer lengths. A shortest escape-path tree calculation module selects a set of escape paths having shorter lengths from the escape-path tree. A risk association module is configured to calculate an escape risk for the target using the selected set of escape paths.

Embodiments of the invention also provide a computer readable medium that comprises an escape-path tree data structure, location data for the target, and location data for an observer robot tracking the target. The escape-path tree data structure is configured to represent escape paths that the target could use to escape detection by a sensor.

DETAILED DESCRIPTION OF EMBODIMENTS OF THE INVENTION

Many applications require continuous monitoring of a moving target by an observer robot having access to a controllable sensor system. While tracking objects is not new, conventional techniques typically ignore the presence of obstacles and focus on imaging and target recognition issues. For a target moving among obstacles, the goal of tracking involves a complex motion problem: a controllable observer a robot needs to anticipate that the target may become occluded by an obstacle and move to prevent such an event from occurring. Embodiments of the invention provide a strategy for computing the motions of a mobile robot operating without prior knowledge of the target's intentions or the distribution of obstacles in the environment. Embodiments of the invention also provide an algorithm that governs the motion of the observer robot based on measurements of the target's position and the location of obstacles in the environment. The algorithm computes a description of the geometric arrangement between the target and the observer's visibility region produced by the obstacles and computes a continuous control rule using this description.

Figure 3:
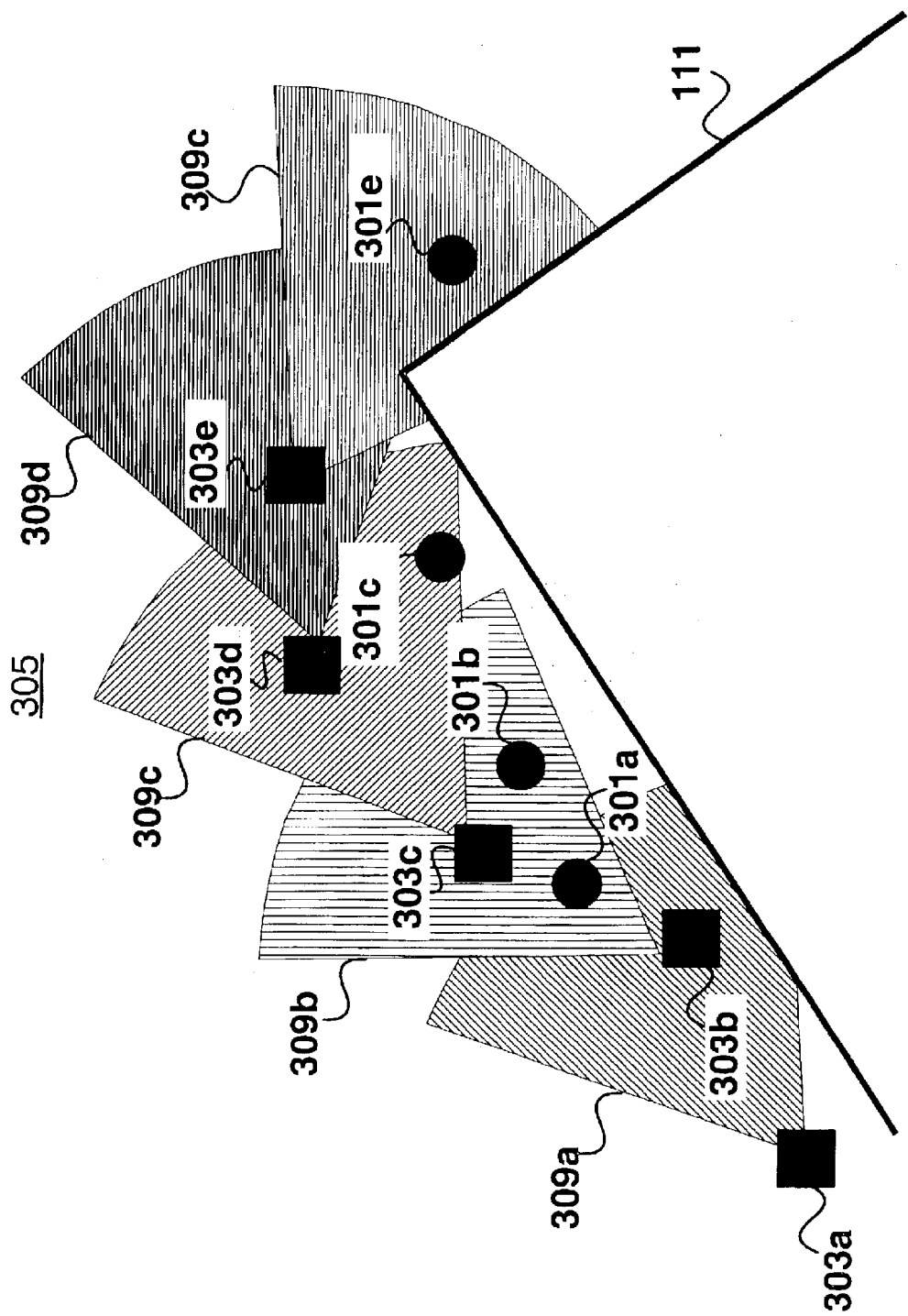
FIG. 3 illustrates the movements of an observer robot applying a tracking algorithm to follow a moving target as it moves around an obstacle, according to an embodiment of the invention.

FIG. 3 illustrates the movements of an observer robot 303 applying a tracking algorithm to follow a moving target 301 as it moves around an obstacle 111, according to an embodiment of the invention. The target 301 could be any moving object, from a robot, to a mechanical device, to an animal, such as a human. The observer robot 303 receives data from a controllable sensor. For example, the observer robot 303 may include a controllable vision sensor mounted on the robot, as well as software that executes the tracking algorithm. The observer robot 303 need not know the target's trajectory in advance in order for the tracking algorithm to provide appropriate instructions to the observer robot 303. The observer robot 303 also requires no prior model, or map, of a workspace 305 and does not know the location of obstacles, such as the obstacle 111. Accordingly, the tracking algorithm aims to avoid sensor (e.g., visual) separation between the observer robot 303 and the moving target 301. The tracking algorithm assumes that any obstacle in the workspace 305 that obstructs the observer robot's field of view also constrains the motions of both the observer robot 303 and the target 301, and vice-versa (e.g., no transparent objects or smoke screens), according to an embodiment of the invention.

From each sensor sweep, the observer robot 303 determines a visibility region 309a–309e (e.g., a local map) for the workspace 301. The observer robot 303, relies on the visibility region 309a–309e, computed on-the-fly from the measurements, produced by its sensor in an embodiment of the invention, to determine its own trajectory while following the target 303. For example, as the target's trajectory progresses, the observer robot's tracking algorithm determines that if the target 301 moves around obstacle 111, then the observer robot 303 will lose sensor contact with the target 301. Accordingly, and in contrast to the observer robot motion shown in FIG. 2, the observer robot 303 moves slightly away from the obstacle 111 as the observer robot 303 tracks the target 301. Thus, when target 301 actually does move around obstacle 111, the observer robot 303 does not lose sensor contact with the target 303, as shown by the sensor sweep indicated in visibility region 309e.

In simple terms, the observer robot's tracking algorithm is analogous to the actions of a person tracking a moving target in an unknown environment using a flashlight that projects only a plane of light. Moreover, the person's flashlight flickers on and off and the person cannot assume that if they lose sight of the target that they can re-locate the target by running after it. The interested reader will find a detailed mathematical description of the tracking problem and its solution following FIG. 13.

Visibility Regions in the Workspace

The tracking algorithm needs to account for the geometry of the workspace 305. In addition to obstructing movement of the robots, obstacles constrain the area of the workspace 305 that is visible to the observer robot 303. For example, the observer robot 303 cannot see around the corner of obstacle 111, which is why the tracking algorithm causes the observer robot's movements from positions 303a–303c to move slightly away from the obstacle 111 and facilitate the observer robot's goal of staying in sensor contact with the target 301.

The observer robot's equipment configuration determines the field of view of its sensors. The observer robot's visibility may be limited to a fixed cone (of various sizes) or restricted by lower and/or upper bounds on the sensor range. For example, the visibility regions shown in FIG. 3 comprise the sectors shown as 309a–309e. The tracking algorithm can compute the visibility region from a synthetic model or from sensor measurements. In the former case, a ray-sweep algorithm can be used to compute the visibility region for conventional polygonal models. For the latter, the visibility region can be measured with a laser range-finder using conventional techniques. A suitable ray-sweep algorithm is discussed in the detailed mathematical description following FIG. 13.

Tracking Strategies

Figure 1:
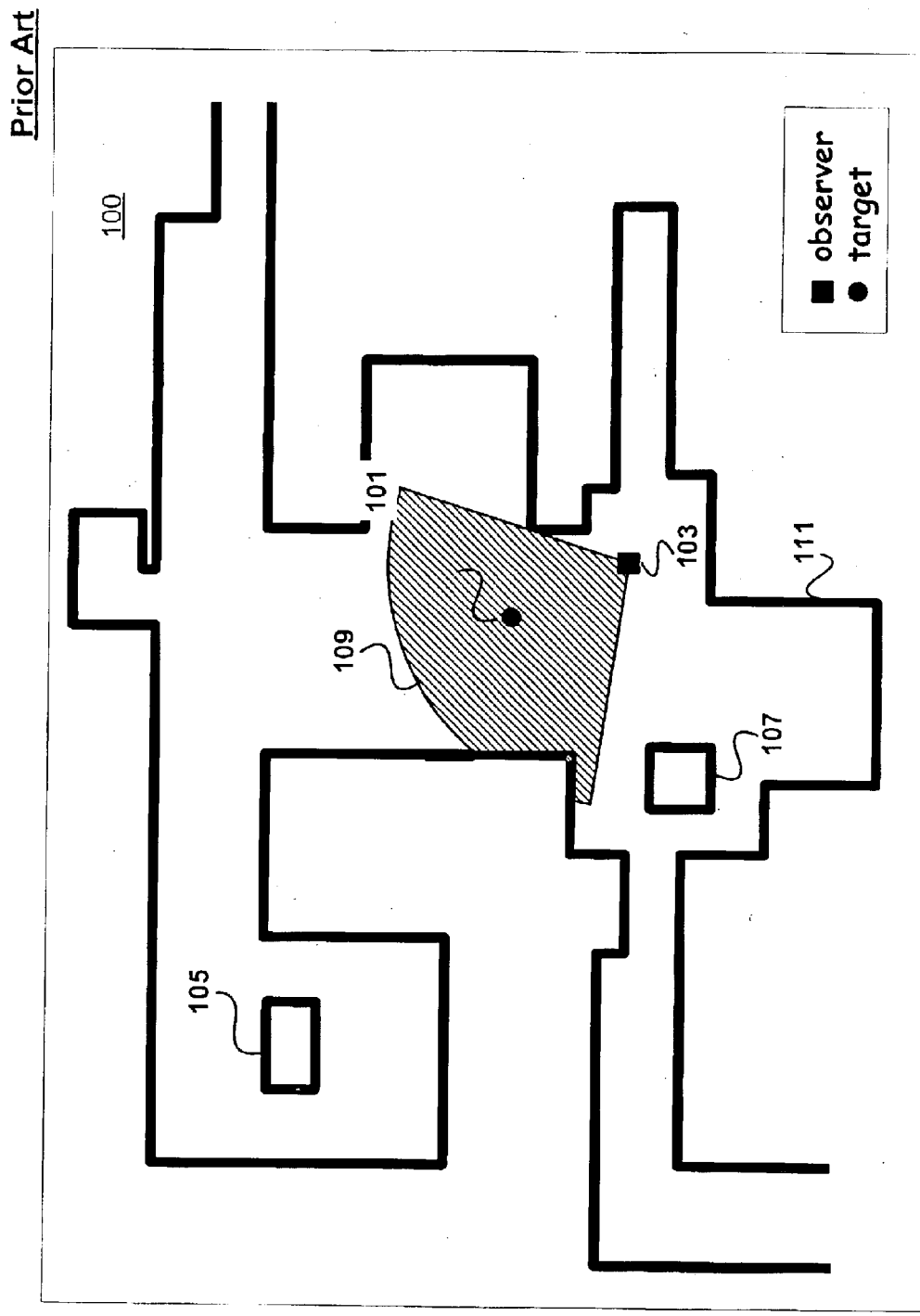
FIG. 1 illustrates a mobile observer robot following a moving target through a workspace.
Figure 2:
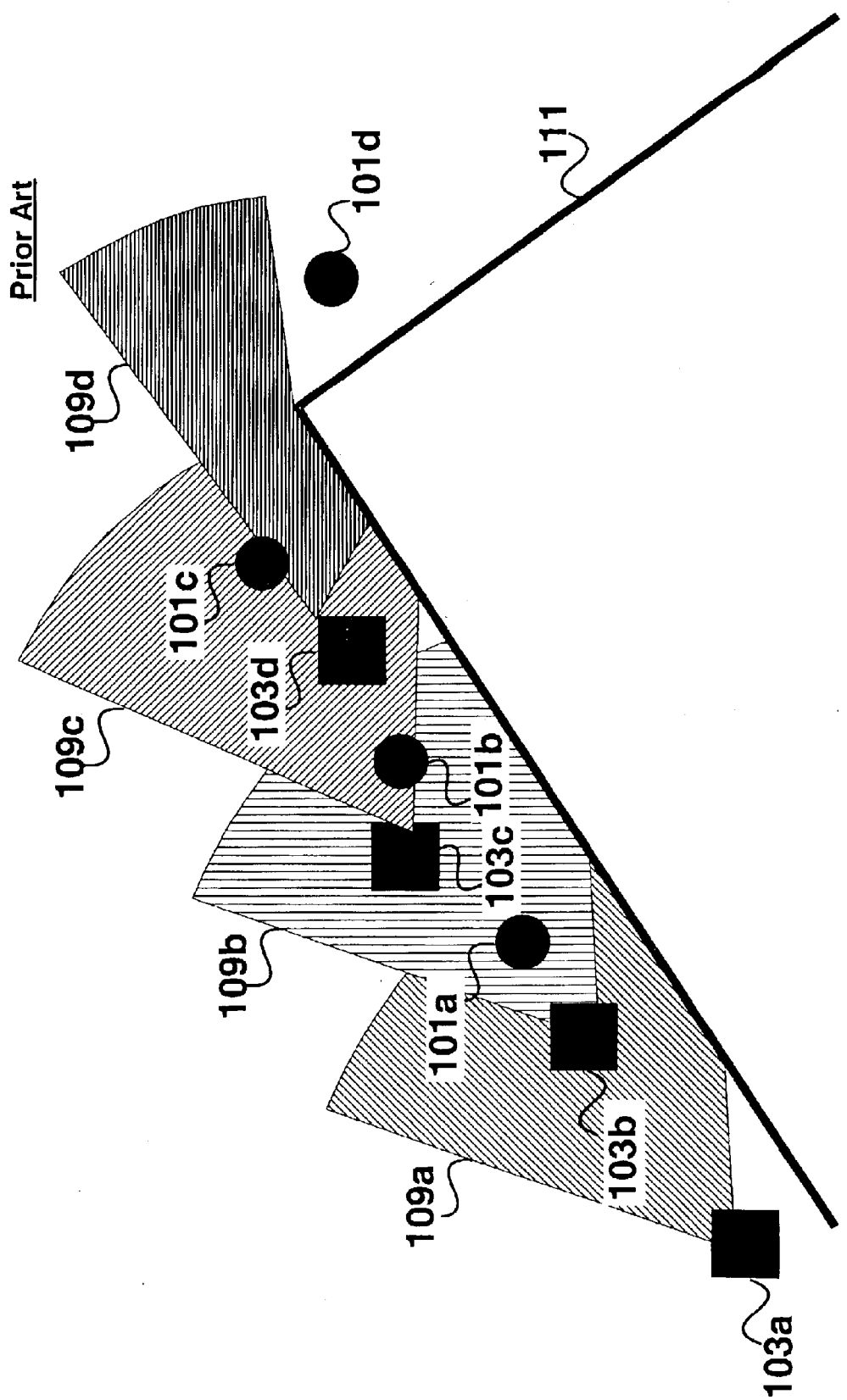
FIG. 2 illustrates a problem that arises when the tracking algorithm used by the observer robot employs only visual servoing to follow the target.

Target tracking comprises computing a function—a tracking strategy—such that the target 301 remains in view by the observer robot 303 at all times. Additionally, the tracking strategy may optimize other criteria, such as the total distance traversed by the observer robot 303, the distance from the observer 303 to the target 301, or a quality measure of the sensor information. In some embodiments, losing track of the target 303 may be unavoidable, in which case an optimal tracking strategy may comprise maximizing the target's "escape time" or "time to escape" ($t_{esc}$)—the time when the observer robot 303 first loses the target 301. For example, as shown in FIG. 2, the escape time is the instant when the target's movement interposes the obstacle 111 between the target 301 and the observer robot 303.

If the target's actions are known in advance for all times, then the target 301 is said to be "predictable." In such cases, the optimal tracking strategy can typically be calculated off-line before the observer robot 303 begins to track the target 301. Because the location of the target 301 is known for all times, the observer robot 303 may re-acquire the target 301 if it becomes lost. For cases where it is impossible to track the target 301 for all times, an alternative is to maximize the "exposure"—the total time the target 301 is visible to the observer robot 303—as an alternative to maximizing the escape time. For example, as shown in FIG. 2, the exposure of the observer robot 103 to the target 101 roughly corresponds to the observer robot's positions 103a–103c.

If the tracking strategy is computed as a function of the target's state at a particular time, then the strategy operates in a closed loop. Otherwise, the tracking strategy runs in open loop. Closed-loop strategies are typically preferred over open-loop ones even for predictable cases, unless there is a guarantee that the target's motion models and position measurements are exact.

When the target's actions are unknown, the target 301 is said to be "unpredictable" and solution to the problem becomes more complicated. FIGS. 2 and 3 both illustrate the movement of unpredictable targets. The unpredictable case can be analyzed in two ways. If the target actions are modeled as "nondeterministic uncertainty," then it is assumed that the target's set of possible actions is known but not the specific action to be taken at a specific time. Thus, the action set is known but not the specific action selected by the target 301 at any instance. In this case, a tracking strategy can be designed that performs the best given the worst-case choices for each given time. Alternatively, if a "probabilistic uncertainty" model is available (e.g., the probability density function is known), then it is possible to compute a motion plan that is the best in the expected sense.

The unpredictable cases typically need to be solved on-line in real time. In the absence of a mechanism for re-acquiring the target 301 should contact be lost, a good tracking algorithm in the observer robot 303 seeks to maximize the escape time as opposed to maximizing the exposure. A strategy designed for the worst-case scenario anticipates the target's most adverse action for a future time horizon, executes a small (possibly differential) initial portion of the computed tracking strategy, and repeats the entire process again. On the other hand, a tracking strategy designed to anticipate the expected target's action seeks to maximize the probability of future sensor visibility of the target 301 to the observer robot 303.

Worst-case tracking based on maximizing the time to escape is especially suitable for antagonistic targets that actively try to avoid the observer robot. Solving this tracking problem can be computationally expensive, especially in a small robot. Embodiments of the invention use the notion of escape risk as a proxy function of the escape time. As will be described, the gradient of the escape risk can be computed analytically resulting in a fast tracking algorithm.

Figure 4:
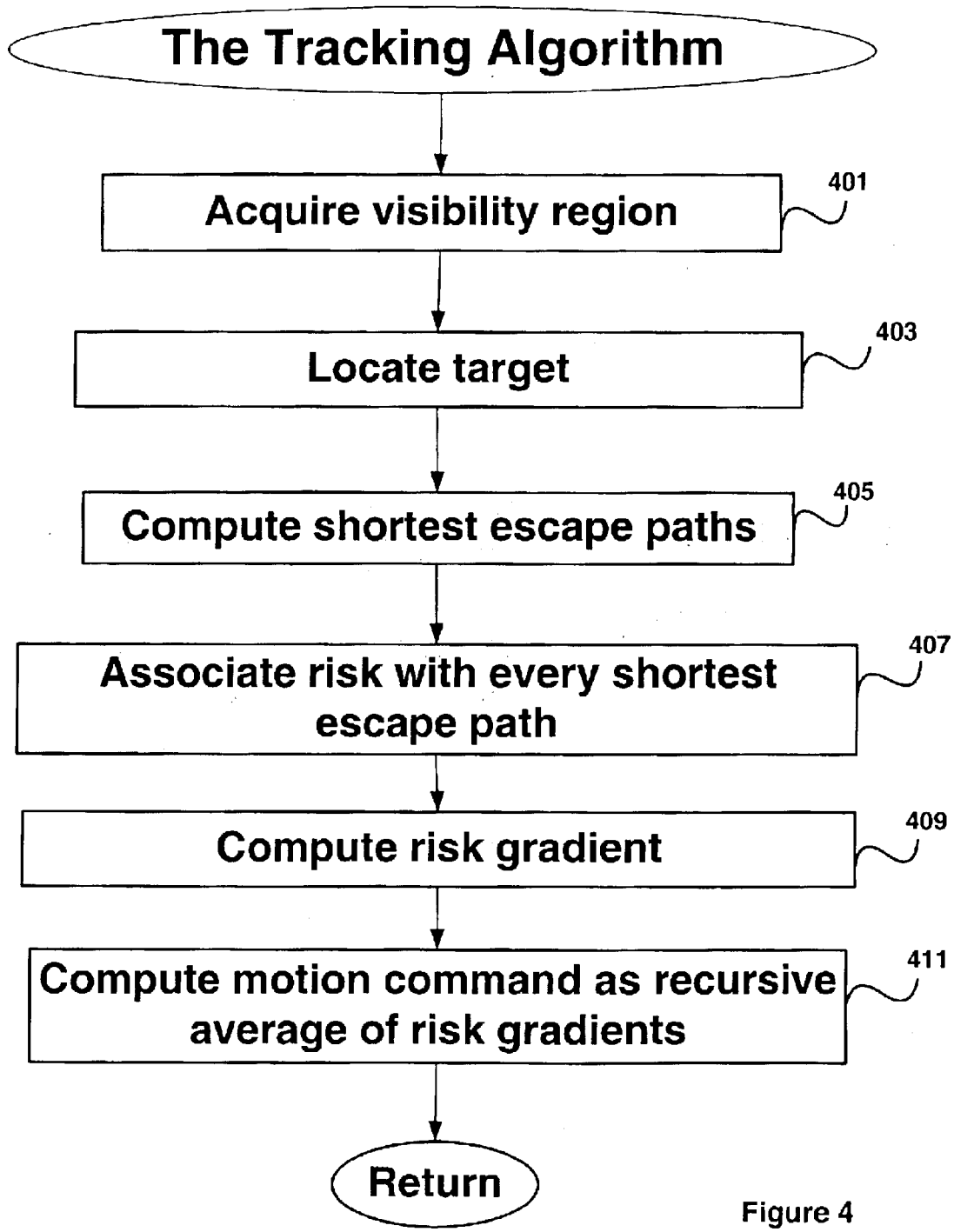
FIG. 4 is a flowchart that depicts the steps performed by the tracking algorithm, according to an embodiment of the invention.

FIG. 4 is a flowchart that depicts the steps performed by the tracking algorithm, according to an embodiment of the invention. At each step, the tracking algorithm minimizes for the observer robot (e.g., the observer robot 303 shown in FIG. 3) the risk that the target (e.g., the target 301 shown in FIG. 3) may escape the observer robot's visibility region. The tracking algorithm requires no prior model of the workspace (e.g., the workspace 305 shown in FIG. 3). The tracking algorithm accommodates transient targets having unknown trajectories. As will be discussed, the tracking algorithm combines both a reactive term and a look-ahead term that together improve the observer robot's ability to stay in contact with the target. The tracking algorithm has been experimentally shown to work well with aggressive targets having highly unpredictable trajectories.

The tracking algorithm repeatedly performs steps 401–411. The track algorithm evaluates the change in the risk of the target's escape ($\phi$) at each time step using two geometric computations. In a first geometric computation, the track algorithm acquires 401 a visibility region (e.g., the visibility region 309a shown in FIG. 3) of the workspace. Step 401 yields the observer robot's visibility region (e.g., region 309a) in the workspace (e.g., the workspace 305 shown in FIG. 3). The sensor's characteristics (e.g., its minimum and maximum range) typically constrain the visibility region, as does the observer's position and the view-obstructing obstacles contained in the visibility region. This visibility data may also be supplied to the track algorithm in other ways (e.g., from other sensors in the workspace). Having its visibility data, the track algorithm can locate 403 the target (e.g., the target 301 shown in FIG. 3) within the visibility region. The specific choice of methods for obstacle and target detection is typically application dependent.

A second geometric computation 405 produces the escape-path tree ("EPT"), a data structure containing the worst-case paths that the target may select to escape from the observer's visibility region. Using the target's location, the track algorithm calculates a shortest escape path for the target. The track algorithm next associates an escape risk 407 with the shortest escape paths for the target using information from the EPT. Calculation and use of the EPT are discussed in greater detail below.

The track algorithm next computes 409 a risk gradient. Differential changes in the observer robot's position typically produce differential changes in the EPT, which in turn produces differential changes in the risk $\phi$. Because the track algorithm may compute this differential change analytically, then the gradient of $\phi$ can be used to direct the motion of the observer robot. This approach provides an on-line strategy for controlling mobile robots, as well as a differential strategy (e.g., a feedback controller). The escape risk gradient computation comprises determining $\nabla \phi^e$ for each free edge e in the workspace, where $\phi^e$ is a measure of the target's escape risk associated to the free edge e. The risk gradient computation comprises calculating $\nabla_{\bar{q}} \phi$ using the escape-path tree prepared in step 405.

The track algorithm then computes 411 a motion command for the observer robot (e.g., the observer robot 303 shown in FIG. 3) as a recursive average of the risk gradients. The observer robot can then be steered using $-\nabla_{\bar{q}} \phi$ as a robot control.

Steps 401–411 of the track algorithm have been shown sequentially in FIG. 4 for clarity purposes. However, it is typically more efficient in actual implementations to intermingle some of these steps. Steps 401–403 and 411 are implementation dependent. Acquiring location and target data depends upon the sensor(s) deployed, and steering control for the robot depends upon the design specifications of the actual robot used. Step 407 comprises evaluating the gradient of an escape equation (to be discussed below) for the escape paths. Step 409 comprises computing a recursive average of the risks of the various escape paths in the EPT developed in step 405.

Accordingly, the speed and efficiency with which step 405 can be executed greatly influences the performance of the tracking algorithm as a whole. For the tracking algorithm to operate in real-time, the computation of the EPT should be performed efficiently. A ray-sweep algorithm represents a suitable approach to efficient performance of the EPT, according to an embodiment of the invention. The characteristics of an appropriate ray-sweep algorithm are provided below.

The track algorithm redirects the observer robot (e.g., the observer robot 303 shown in FIG. 3) several times per second based on the differential change in a measure $\phi$ of the risk that the target escapes its field of view, according to an embodiment of the invention. The track algorithm computes $\phi$ deterministically as a function of how quickly the target can escape and how easy it is for the observer robot to react to such an event. For example, if the target can escape by moving around a corner (e.g., the obstacle 111 shown in FIG. 3), then $\phi$ grows with the distance between the observer robot and the corner. This approach acknowledges that occlusions may be difficult to clear if the observer robot is far away from the edge that produces the occlusion.

FIGS. 5–8 provide additional information on acquisition of the visibility region, location of the target, construction of the EPT, and determination of the shortest escape paths.

Figure 5:
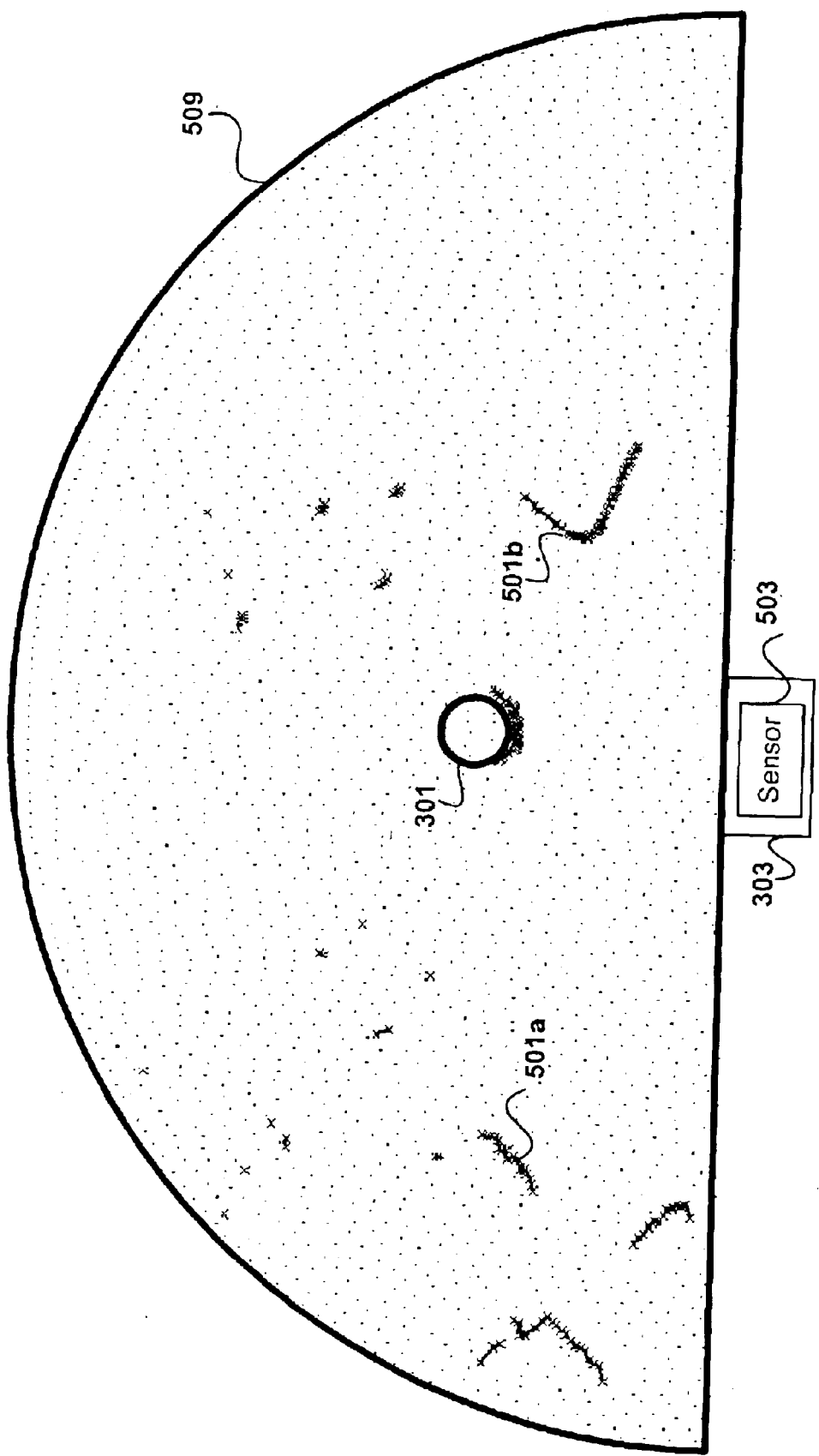
FIG. 5 illustrates sensor data supplied to the track algorithm by a sensor that can be used to determine the visibility region and locate the target, according to an embodiment of the invention.

FIG. 5 illustrates sensor data 509 supplied to the track algorithm by a sensor 503 that can be used to determine the visibility region (e.g., the visibility region 309a shown in FIG. 3) and locate the target, according to an embodiment of the invention. The illustrated sensor data 509 represents a single plane of information about the workspace. The track algorithm may use the sensor data 509 to determine the observer robot's visibility region by identifying obstacles 501a–501b and identifying the target 301. As shown in FIG. 5, the track algorithm has already identified the target, as indicated by the smooth circle placed around the target 301. In some embodiments, identification of the target may be simplified when some characteristics of the target are known to the track algorithm. For example, if the track algorithm knows that the target will present a circular image having a radius r to the observer robot's sensors, then the track algorithm may more easily identify the target than in the absence of such information. The jagged marks showing obstacles 501a–501b indicate that the track algorithm has not yet identified this sensor data as "obstacles" in the visibility region.

Figure 6:
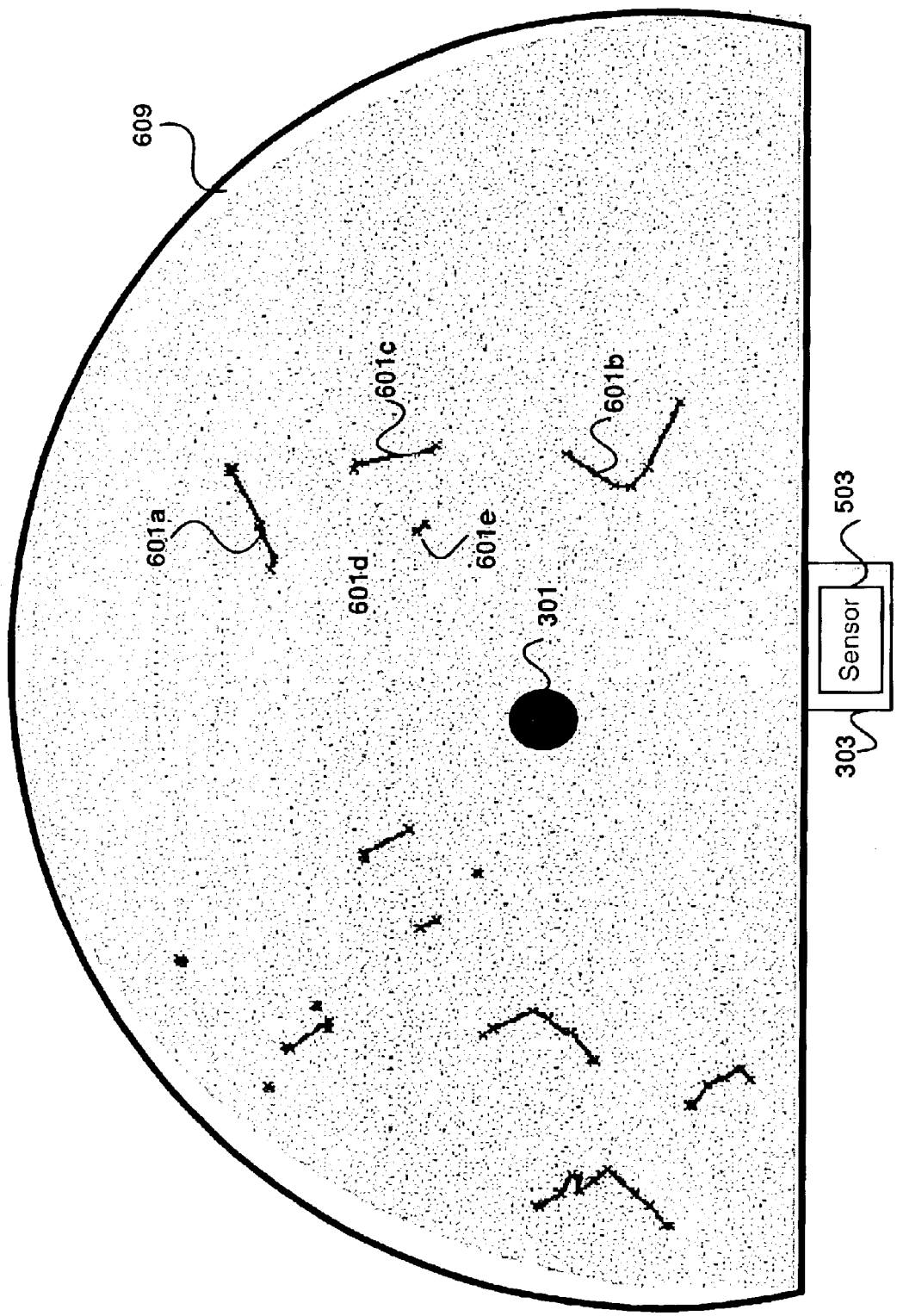
FIG. 6 illustrates a visibility region containing obstacles identified by the track algorithm, according to an embodiment of the invention.

FIG. 6 illustrates the visibility region 609 containing obstacles 601a–601e identified by the track algorithm, according to an embodiment of the invention. As previously discussed, the obstacles 601a–601e constitute escape risks in that the observer robot may lose sensor contact with the target should one of the obstacles become interposed between the observer and the target. The visibility region 609 provides the track algorithm with an instantaneous map of the workspace (or at least the portion of the workspace recognizable by the observer robot's sensors).

Figure 7:
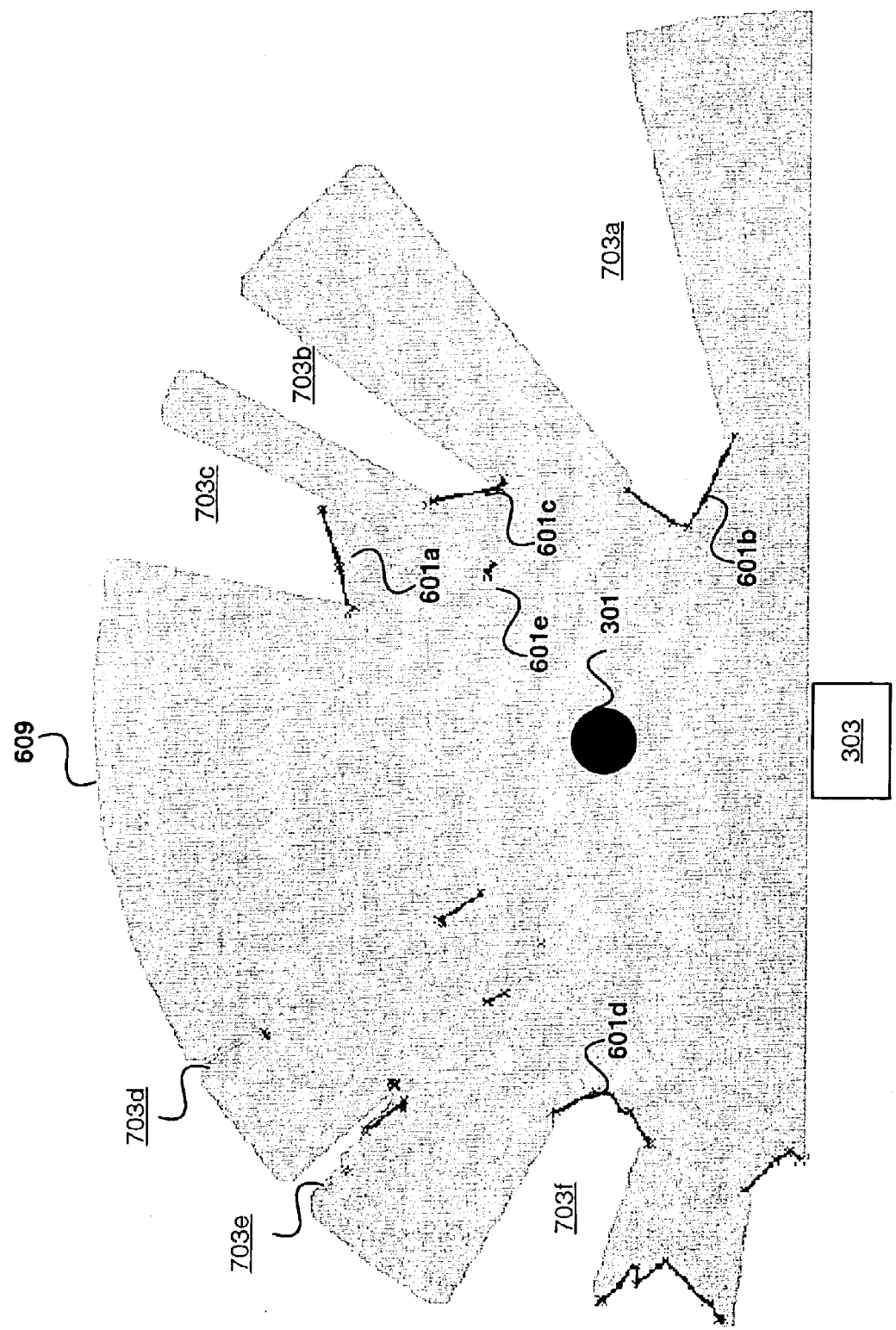
FIG. 7 illustrates a first step in the transition of the visibility region into an escape path tree ("EPT"), according to an embodiment of the invention.

FIG. 7 illustrates a first step in the transition of the visibility region 609 into an escape path tree ("EPT"), according to an embodiment of the invention. Having determined the location of the obstacles (e.g., the obstacles 601a–601e) in the visibility region 609, the track algorithm can next determine the possible occlusions 703a–703f represented by those obstacles. For example, based on the observer robot's position if the target 301 passed into occlusion 703a, then the observer robot 303 would lose track of the target 301 due to the obstacle 601b. The region represented by each occlusion 703a–703f provides the target with escape opportunities. In other words, in order to escape from the observer robot 303, the target 301 need not just barely slip by an obstacle (e.g., obstacle 601b), instead the target 301 just needs to slip into the obstacle's occlusion field (e.g., anywhere in the occlusion field 703a). Accordingly, the shortest escape path for the target can be determined based upon the target's distance to the edge of an occlusion region.

For example, suppose that the target 301 is visible to the observer robot 303. An "escape path" for the target 303 is any collision-free path connecting the target 303 to a point outside the observer robot's visibility region (e.g., the occlusion 703c). The "escape point" of this path is the point where the path intersects the boundary of the observer robot's visibility region, which always occurs along a free edge. A free edge of an occlusion region typically represents a portion of the occlusion (e.g., the occlusion 703c) that is not an obstacle (e.g., the obstacle 601a) since the obstacles are assumed to be impenetrable by the target 301 in this embodiment. Of course, there exists an infinite number of escape paths for a particular configuration of target 301 and observer robot 303. However, for a particular escape point, there exists a path of minimal length between the escape point and the target. Moreover, for any free edge e, there exists an escape path of minimal length among all escape points along that edge. Such a path is called the target's "shortest escape path" ("SEP") through the free edge e. The length of SEP is the shortest distance to escape ("SDE") through the free edge e. The shortest time in which the target 301 may traverse an escape path is the "escape time" for that path. For any free edge e and a given target location, there exists a path of minimal escape time, and in general this is not equal to the SEP.

Figure 8:
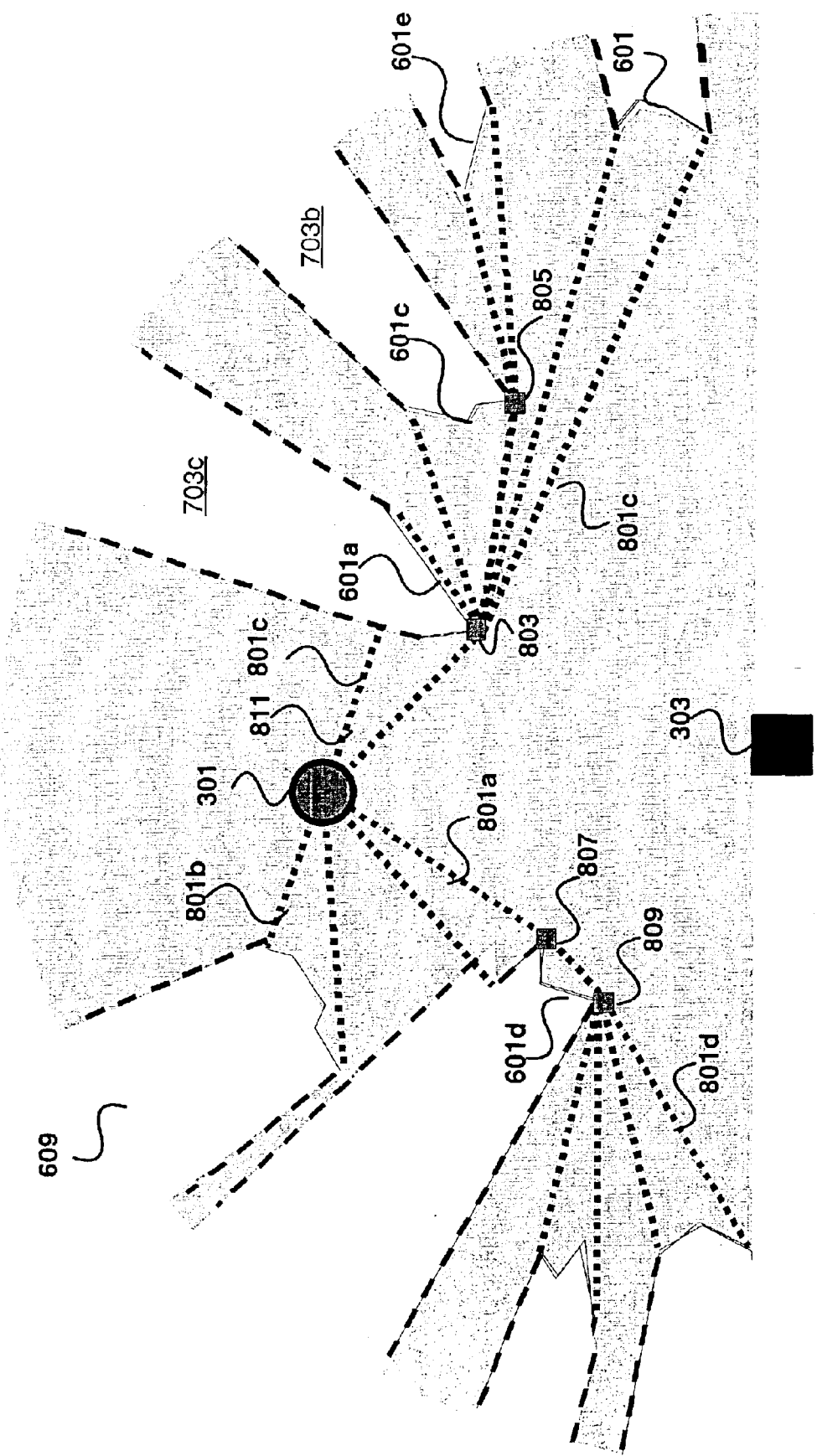
FIG. 8 illustrates an escape-path tree imposed over the visibility region, according to an embodiment of the invention.

FIG. 8 illustrates an escape-path tree 811 imposed over the visibility region 609, according to an embodiment of the invention. As previously discussed, the EPT 811 represents a data structure typically stored in memory in the observer robot. However, the EPT 811 has been imposed over the visibility region 609 to assist the reader's understanding of the EPT and its relationship to the sensor data received by the tracking algorithm.

If all the escape paths are computed for a configuration, these form a tree structure, the "escape-path tree." The root of this tree is the target (e.g., the target 301), and each branch in the tree terminates in a free edge. The complexity of this tree is linear, since each node (e.g., node 807) in the EPT is a vertex in the visibility region.

The EPT 811 maps that possible paths that the target 301 could take to escape from view by the observer robot 303. The path can be drawn to the edge of an occlusion or to an obstacle's edge. The EPT 811 also indicates distance relationships between escape paths. For instance, the EPT 811 indicates that escape path 801a is a parent of escape path 801d. In other words, the target 301 would travel along escape path 801a to reach escape path 801d. Visual inspection of EPT 811 indicates that the shortest two escape paths for the target 301 are escape path 801b and escape path 801c.

Computing escape paths is important because a tracking strategy based on expecting the worst-case scenario assumes that the target will escape by taking the quickest route (e.g., escape path 801b). One such strategy is to move the observer robot 303 to a position that locally minimizes SDE. This assumes that the tracking algorithm can compute the shortest escape path. The SDE is a worst-case measure of the likelihood that the target leaves the observer robot's field of view. The larger the SDE, the more likely will target remain in view to the observer robot. An alternative is to minimize the average length over all paths SEP, or optimize a similar function operating over all the individual paths.

FIGS. 9–12 describe the reactive term and the look-ahead term that are included in the tracking algorithm and that together improve the observer robot's ability to stay in contact with the target (e.g., the target 301).

Figure 9:
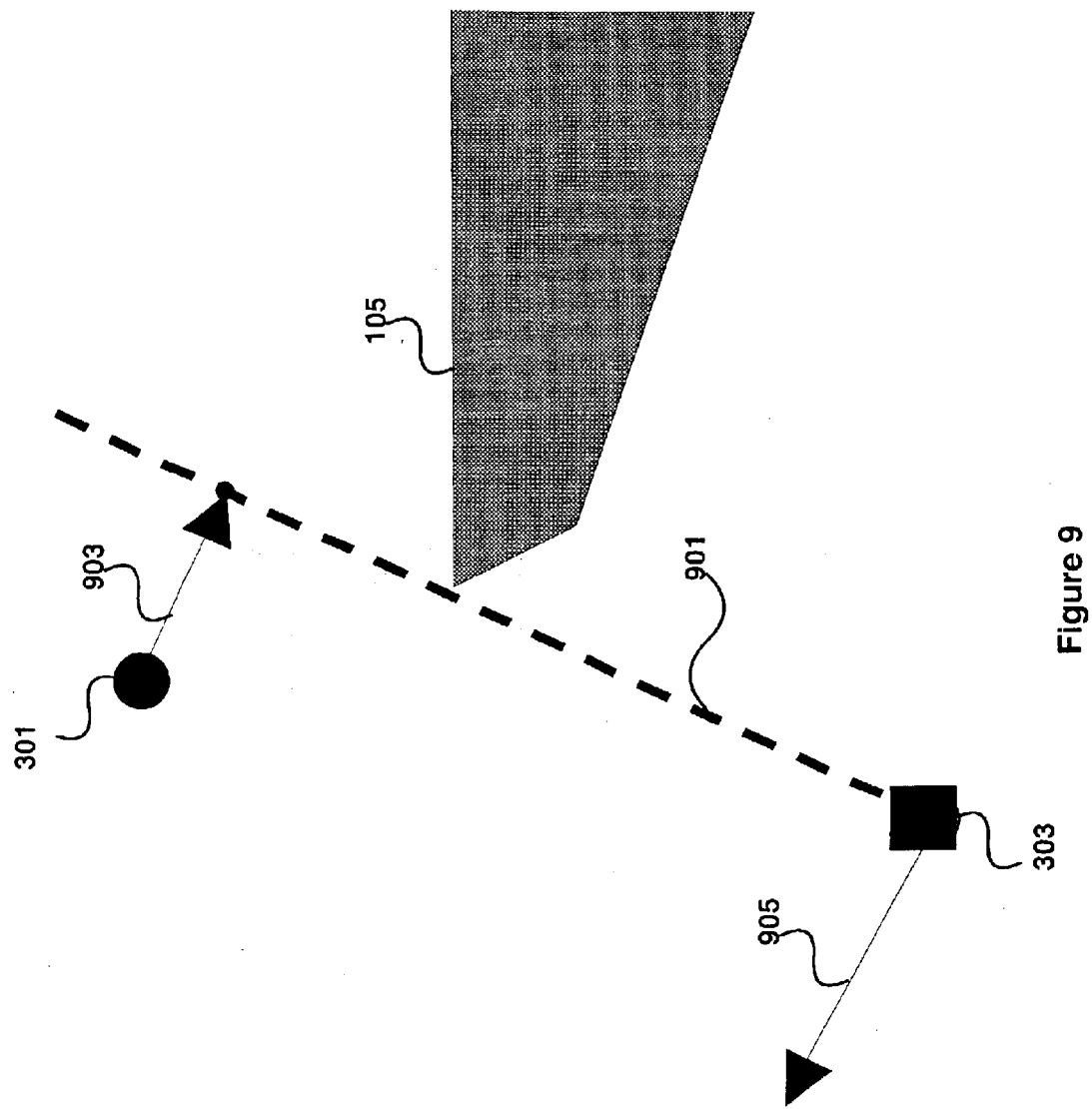
FIG. 9 illustrates some initial considerations for a tracking algorithm's risk-based strategy, according to an embodiment of the invention.

FIG. 9 illustrates some initial considerations for a tracking algorithm's risk-based strategy, according to an embodiment of the invention. As previously discussed, as the target 301 moves towards an occlusion, the observer robot 303 reacts by moving away from the occlusion. A line 901 indicates the observer robot's loss of sensor contact with the target 301 based upon the target's passage into the occlusion represented by the edge of the obstacle 105. Thus, as the target 301 moves along escape path 903 towards the occlusion provided by obstacle 105, the observer robot 303 reacts by moving along a path 905. The risk that the target 301 can escape from the observer robot can be represented as a monotonically increasing function of the multiplicative inverse of the length of the shortest escape path (e.g., path 903).

Figure 10:
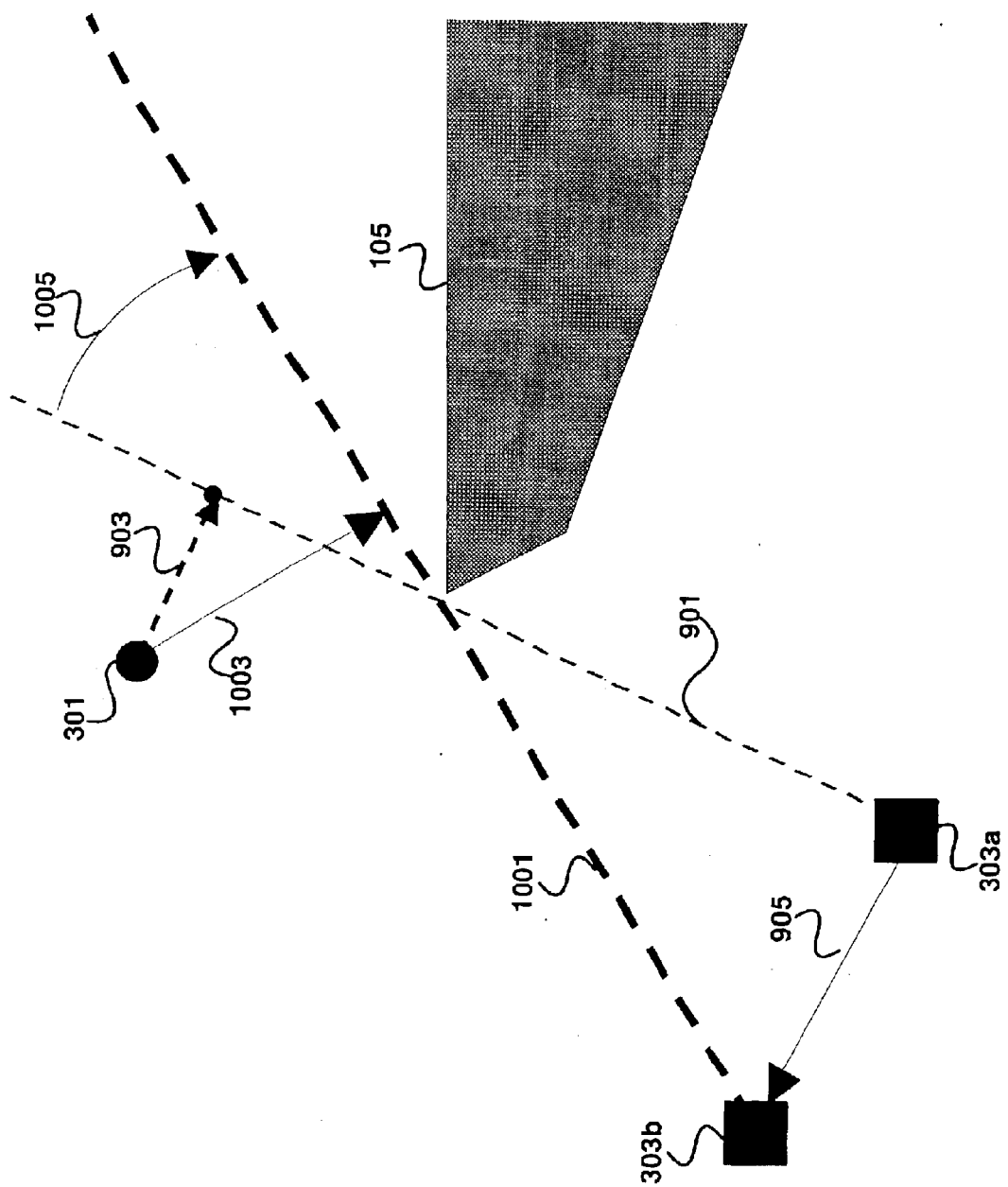
FIG. 10 illustrates further movement of the target towards the occlusion created by the obstacle and the role of the reactive component, according to an embodiment of the invention.

FIG. 10 illustrates further movement of the target 301 towards the occlusion created by the obstacle 105 and the role of the reactive component, according to an embodiment of the invention. As the observer robot 303 moves along path 905, the shortest escape path for target 301 is no longer path 903 but becomes path 1003 instead. Accordingly, a line 1001 now represents the observer robot's loss of sensor contact with the target 301 based upon the target's passage into the occlusion created by the obstacle 105. Thus, this new escape path can be used to determine another location for the observer robot 303.

FIGS. 9 and 10 have described the "reactive" component of the tracking algorithm, according to an embodiment of the invention. This is the portion of the tracking algorithm that responds to the movement of the target 301 by attempting to minimize the risk associated with the shortest escape path. However, minimizing this risk is not the only factor that the tracking algorithm should consider. For instance, if the target takes a particular trajectory towards the occlusion created by the obstacle 105, then the tracking algorithm (in the absence of a "lookahead" component) would continue to move away from the obstacle 105 so as to delay the loss of contact with the target 301. Unfortunately, if the observer robot 303 continues to follow the "reactive" component's trajectory, then the distance between the target 301 and the obstacle 105 will continue to grow. The increase in this distance could cause problems for the observer robot 303 in future trajectories adopted by the target 301.

Figure 11:
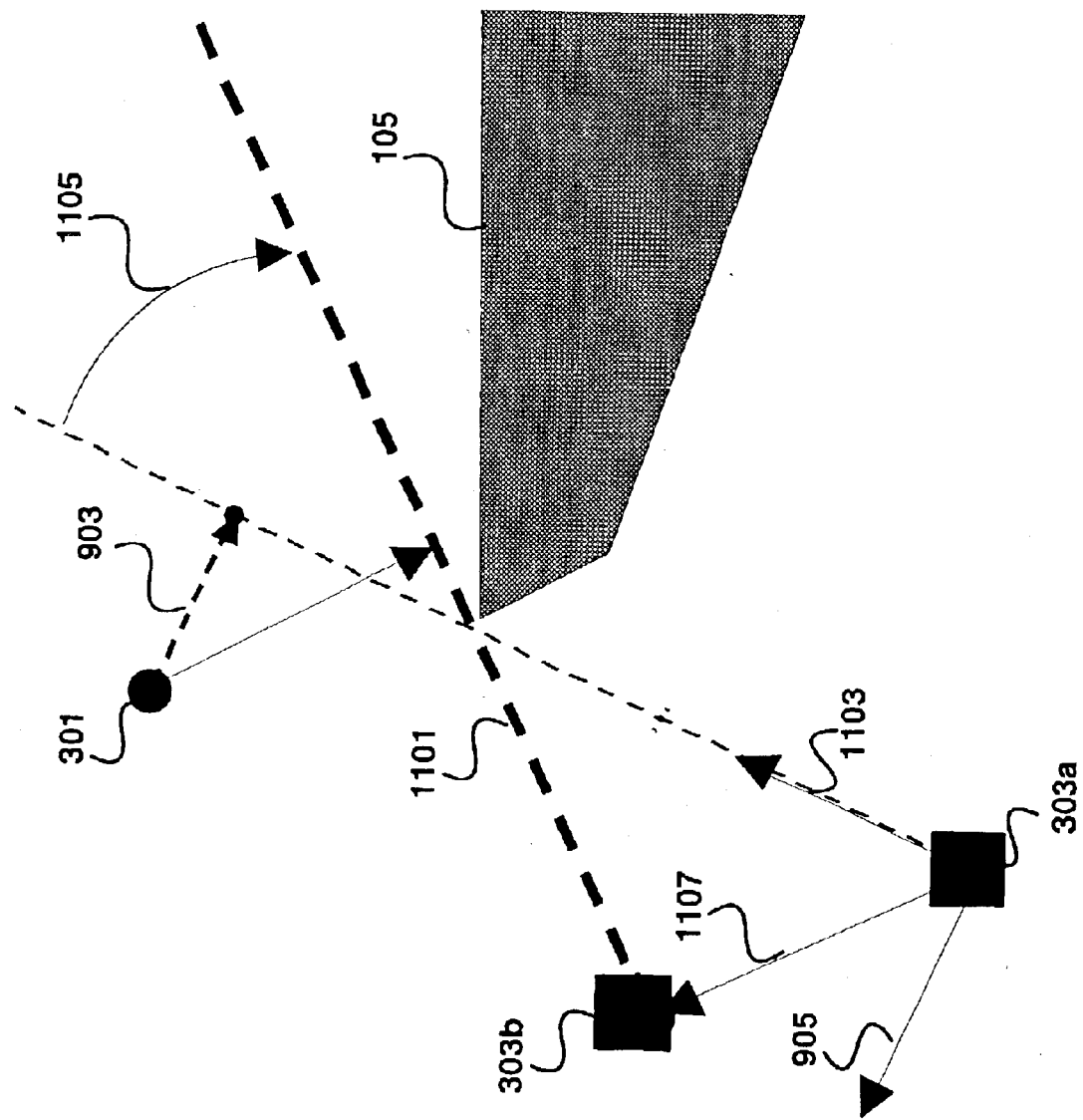
FIG. 11 illustrates the combination of the reactive component and a look-ahead component and into a trajectory for the observer robot, according to an embodiment of the invention.
Figure 12:
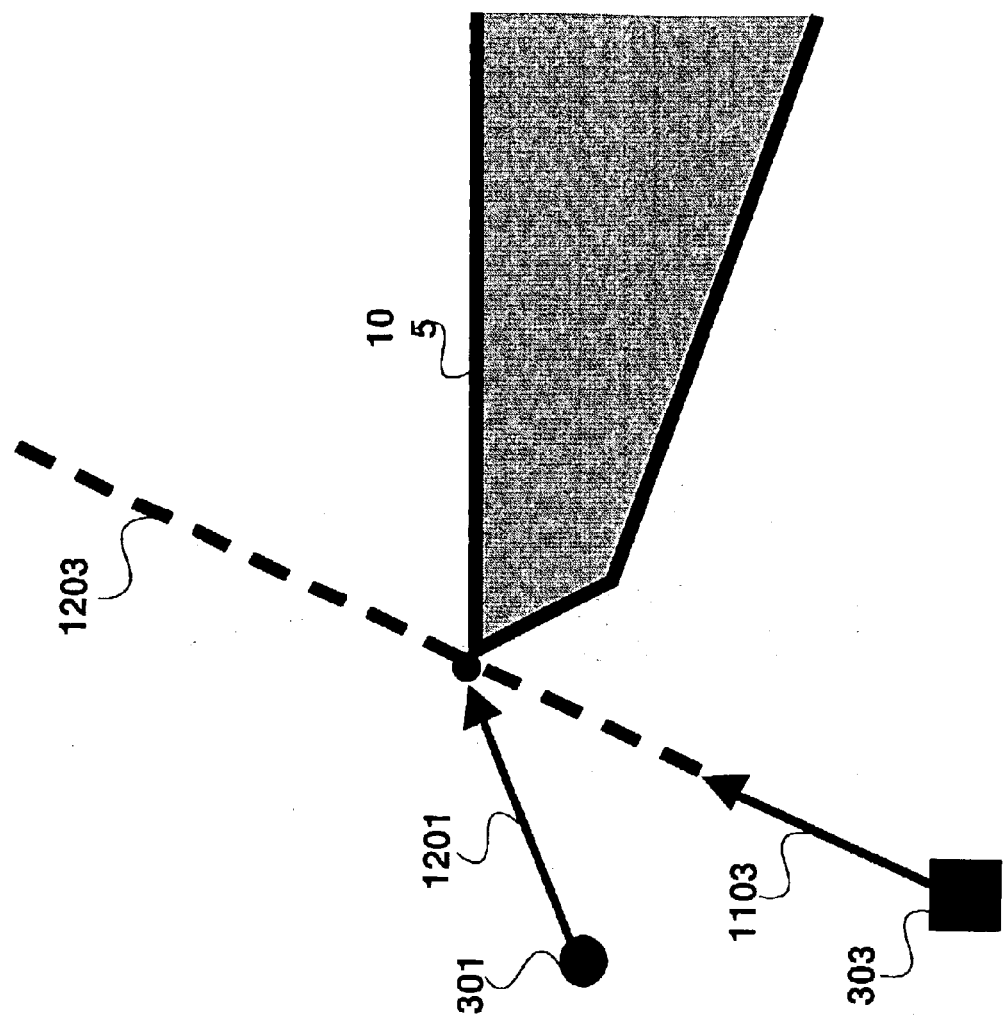
FIG. 12 further illustrates the role of the look-ahead component by providing an example in which the target is on the same side of the obstacle as the observer robot.

FIG. 11 illustrates the combination of the reactive component 905 and a look-ahead component 1103 and into a trajectory 1107 for the observer robot, according to an embodiment of the invention. FIG. 12 further illustrates the role of the look-ahead component 1103 by providing an example in which the target 301 is on the same side of the obstacle 105 as the observer robot 303. In this example, the target's shortest escape path 1201 is toward the obstacle 105. Accordingly, the observer robot's trajectory (for the illustrated time period) essentially amounts to a race along the observer robot's occlusion line 1203. The look-ahead component can be represented by the square of the distance between the observer robot and the occlusion point.

Returning to FIG. 11, the observer robot's path follows neither the trajectory of the reactive component 905 nor the trajectory of the look-ahead component 1103. The tracking algorithm combines both the reactive component 905 and the look-ahead component such that the observer robot moves along the trajectory 1107.

As mentioned earlier, the function used in the track algorithm as a proxy for the time to escape is the "escape risk," defined for every free edge e as follows:

$$\phi^e = c r_o^2 f(1/h) \qquad \text{(The Tracking Equation)},$$

where $h = SDE(e, q^r)$ is the shortest distance between the target and the edge e, $r_o$ is the distance from the observer robot ($q^0$) to the corner causing the occlusion at e, d is the distance between the target ($q^r$) to this corner, $c > 0$ is a constant and $f(1/h)$ is a monotonically increasing function of $1/h$. The term $c r_o^2$ is the "look-ahead" component because its minimization increases the future ability of the observer robot to track. The term $f(1/h)$ is the "reactive" component because its minimization decreases the likelihood that the target escapes the current visibility region. Specific embodiments of $f(1/h)$ are $\log(1/h^2 + 1)$, and $(1/h)^{m+2}$, where m is a non-negative integer.

It is possible to compute the gradient of the tracking equation with respect to the observer's position in closed form. The gradient is given by different formulas depending on the way the escape path $SEP(e, q^r)$ exits $V(q^0)$ (e.g., through a vertex of $V(q^0)$ or through a corner). In general, the gradient of the risk function at every edge e has the form:

$$-\nabla \phi^e = 2 c r_o f(1/h) + c (r_o/h)^2 f'(1/h) \nabla h.$$

Here, $f'(1/h)$ is the mathematical derivative of $f(1/h)$ and $\nabla h$ is the gradient of h. $\nabla h$ is calculated according to the geometry of the escape path $SEP(e, q^r)$ associated to the edge e. The gradient computation can be degenerate when the target is a single point, but it is well defined for targets with physical dimensions. Because $\nabla \phi^e$ is computed analytically, the track algorithm only requires current sensor information. For example, in an embodiment of the invention the function $f(1/h)$ is equal to $(1/h)^2$. For the scenario shown in FIG. 11, the risk gradient becomes:

$$-\nabla \phi^e = -2 c r_o (1/h)^2 \hat{p} + 2 c \delta r_o (1/h)^3 t,$$

and for the scenario shown in FIG. 12, the risk gradient becomes:

$$-\nabla \phi^e = -2 c r_o (1/h)^2 \hat{p} + 2 c \sigma r_o (1/h)^3 t.$$

Here c is a constant, h is a shortest distance between the target and the occlusion between an observer robot and the target, $r_o$ is a distance from the observer robot to the obstacle that causes the occlusion, $\delta$ is the distance from the target to said obstacle, a is the target's radius, and ($\hat{p}$, t) is a coordinate system local to the observer robot.

Thus, the tracking strategy comprises moving the observer robot (e.g., the observer robot 303 shown in FIG. 3) in the opposite direction of the average of $\nabla \phi^e$ over all free edges e in $V(q^o)$. Let $\nabla_{\bar{\phi}}$ denote this average. $\nabla_{\bar{\phi}}$ can be computed using the escape-path tree as explained before. However, other ways of aggregating the individual risks are possible.

Figure 13:
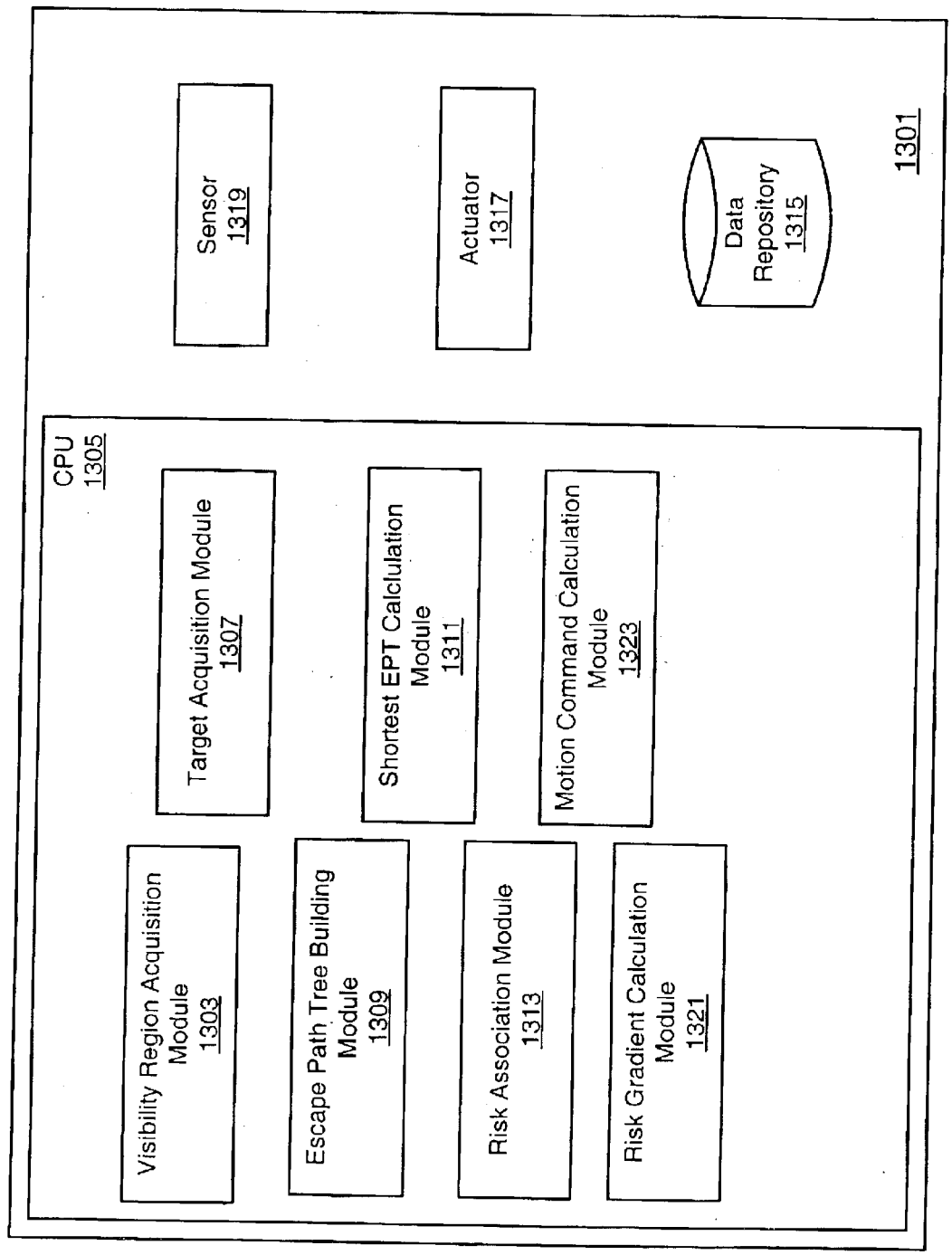
FIG. 13 is a block diagram of an observer robot configured to perform the tracking algorithm, according to an embodiment of the invention.

FIG. 13 is a block diagram of an observer robot 1301 configured to perform the tracking algorithm, according to an embodiment of the invention. When executing the tracking algorithm, a CPU 1305 on the robot 1301 contains instructions for carrying out the various steps of the tracking algorithm (e.g., the steps 401–411 shown in FIG. 4). Accordingly, the CPU 1305 may contain software modules such as a visibility region acquisition module 1303, a target acquisition module 1307, an escape-path tree building module 1309, a shortest EPT calculation module 1311, a risk association module 1313, a risk gradient calculation module 1321, and a motion command calculation module 1323.

The visibility module 1303 produces from sensor data the visibility region (e.g., the visibility region described in step 401 of FIG. 4) used by the tracking algorithm. The target acquisition module 1307 performs the step (e.g., the target acquisition step 405 of FIG. 4) of identifying the target in the visibility region. The escape-path tree building module 1309 constructs an EPT from the data included in the visibility region. The shortest EPT calculation module 1307 determines the shortest escape path for the target in the EPT produced by the module 1309. The risk association module 1313 performs the step (e.g., the step 407 of FIG. 4) of associating risk with the shortest escape path determined by the module 1307. The risk gradient calculation module 1321 performs the step (e.g., the step 409 of FIG. 4) of computing the risk gradient. The motion command calculation module 1323 uses the risk gradient calculation provided by the module 1321 to provide a motion command to the robot 1301.

The tracking algorithm modules are all shown in the CPU 1305 in FIG. 13 for clarity. In actual implementation, a module (or even a portion of a module) only needs to be in the CPU 1305 at the instant in which its instructions need to be executed. Similarly, while the tracking algorithm has been described here as comprising various software modules, the tracking algorithm could be embodied in physical hardware in a form such as an application specific integrated circuit ("ASIC") or other suitable hardware. Accordingly, the tracking algorithm can be deployed in a variety of robotic platforms.

The robot 1301 also contains a data repository 1315 that contains a non-volatile copy of the tracking software that can be copied into the CPU 1305 as needed. The data repository 1315 can also contain the EPT produced by the EPT module 1309, as well as other data produced by the various modules of the tracking algorithm. A sensor 1319 provides the raw sensor data to the visibility region acquisition module 1303 that is used to form the visibility region and that is also used by the target acquisition module 1307 to identify the target in the visibility region. An actuator 1317 receives the motion commands provided by the command calculation module 1323 to move the robot 1301 in such a manner so as to maintain sensor contact with the target (e.g., the target 301 shown in FIG. 3).

The observer robot 1301 can successfully track fairly swift targets despite an abundance of data being acquired by the sensor 1319. In one embodiment, the control rate for the EPT module 1309 and the risk gradient calculation module 1321 is approximately 10 Hz. Accordingly, the actuator 1317 of the robot 1301 is receiving new commands on a fairly rapid basis.

Improvements to the tracking processing may be achieved by embedding the tracking algorithm in a faster processor or a specialized circuit. The tracking process could also be aided by improvements in the speed of the sensor 1319, as well as the addition of other sensors (e.g., another camera) that could assist in the process of target acquisition and obstacle identification.

The tracking problem is often interwoven with that of robot self-localization. This happens when the tracking algorithm uses a prior map of the environment to calculate the observer robot's actions. Self-localization is typically performed using landmarks. In some prior art systems, landmarks comprise artificial ceiling landmarks scattered throughout the workspace. The observer robot localizes itself with good precision if a landmark is visible. Otherwise, the observer robot navigates by dead reckoning, and the observer's position uncertainty increases until the next landmark observation.

Some prior art techniques do not explicitly require the observer robot to see landmarks for self localization, and some related algorithms decide at each stage whether it is preferable to perform the best tracking motion or deviate from this motion in order to see a landmark and achieve better self-localization. Of course, if the observer robot does not require a prior map and makes all its decisions based on a local map computer from its sensor inputs, then the localization problem is solved implicitly and no other self-localization mechanism is required.

The tracking algorithm has been described herein as an operation based on sensor data for a single plane. The tracking algorithm would operate in a similar manner if additional planes of data were provided. For instance, this additional information could be used to more precisely identify obstacles through which the target and observer robot could not pass. Additionally, the tracking algorithm can model as obstacles objects such as holes, stairs, and poles with which the target could move either up or down.

Detailed Mathematical Description

The following section provides a more precise and detailed mathematical description of the tracking algorithm described in FIGS. 3–13. A more precise statement of the problem solved by the tracking algorithm is that the observer robot (e.g., the observer robot 303 shown in FIG. 3) and the target (e.g., the target 301 shown in FIG. 3) move in a bounded Euclidean subspace $W \subset \Re^2$ (e.g., the workspace 305). The observer robot 303 and the target 301 are assumed to be rigid bodies, and their free configuration spaces are denoted $C^o$ and $C^t$, respectively. Let $\chi$ be the state space of the problem, which is the Cartesian product of the individual state spaces of both the observer robot 303 and the target 301. The Cartesian product $C^o \times C^t$ is equal to $\chi$ in the absence of dynamics. In general, however, $C^o \times C^t$ is a subspace of the state space.

The observer robot's configuration at time t is defined as $q^o(t) \in C^o$ and $x^o(t)$ as its state. Let $f^o$ be the transition equation for the states of the observer robot: $\dot{x}^o(t) = f^o(x^o, u)$, where u(t) is the control or action selected for the observer robot's movement from a control set U at time t. The function $f^o$ models the observer's dynamics and may encode non-holonomic restrictions or other constraints. For example, the function $f^o$ describes the observer robot's movement from 303a to 303b in FIG. 3.

Similarly, let $q^t(t) \in C^t$ be the configuration of the target 301 at time t and $x^t(t)$ its state. The transition equation for the target 301 is given by $\dot{x}^t(t) = f^t(x^t, \theta)$, with the action $\theta(t)$ selected from a target control set $\Theta$. For a reactive target with knowledge about the observer's actions, $f^t$ depends on $x^o(t)$ or $q^o(t)$. In the case when the target is predictable, the target's transition equation simplifies to $\dot{q}^t = f^t(q^t(t))$. However, as discussed above, the tracking algorithm described herein requires no advanced knowledge of the target's movements.

Together, $f^o$ (for the observer robot 303) and $f^t$ (for the target 301) define a state transition equation $\dot{x}(t) = f^t(x, u, \theta)$, where $x(t) = (x^o(t), x^t(t))$. The state can be mapped into a configuration pair by a function $(q^o, q^t) = H(x)$, where H: $\chi \to C^o \times C^t$ is a mapping that is not infective in general.

Visibility Regions in the Workspace

The observer's configuration determines the field of view of its sensors (e.g., the sensor 503 shown in FIG. 5). More precisely, let $V(q^o) \subseteq W$ be the set of all locations where the target 301 is visible to an observer robot 303 located at $q^o$ (e.g., $q^o$ is the observer's position at 303a in FIG. 3). The set $V(q^o)$ is the "visibility region" at the observer's position $q^o$ and can be defined in several ways. For example, the observer may have a 360-degree field of view and the target may be a point in W. In this case, the target is said to be visible if and only if ("iff") the line-of-sight to the observer is un-obstructed. In other examples, visibility may be limited to some fixed cone or restricted by lower and/or upper bounds on the sensor range. For example, the visibility regions shown in FIG. 7 comprises the shaded portion of the semi-circle that contains the target 301. The tracking algorithm can compute the visibility region from a synthetic model or from sensor measurements. In the former case, a ray-sweep algorithm can be used to compute the visibility region for conventional polygonal models. For the latter, the visibility region can be measured with a laser range-finder using conventional techniques.

Tracking Strategies

Target tracking comprises computing a function u*(t)—a tracking strategy—such that the target 301 remains in view by the observer robot 303 for all t∈[0,T] (where T is the horizon of the problem). Additionally, the tracking strategy may optimize other criteria, such as the total distance traversed by the observer robot 303, the distance from the observer robot 303 to the target 301, or a quality measure of the visual information. In some embodiments, losing track of the target 301 may be unavoidable, in which case an optimal tracking strategy may comprise maximizing the target's "escape time" or "time to escape" ($t_{esc}$)—the time when the observer robot 303 first loses the target 301. For example, as shown in FIG. 2, the escape time is the instant when the target 101 rounds the obstacle 111.

If the target action $\theta(t) \in \Theta$ is known in advance for all $t \leq T$, then the target 301 is said to be "predictable." In such cases, the optimal tracking strategy can typically be calculated off-line before the observer robot 303 begins to track the target 301. Because the location of the target 301 is known for all t, the observer robot 303 may re-acquire the target 301 when it is lost. Therefore, for cases where it is impossible to track the target 301 for all t≦T, an alternative is to maximize the "exposure"—the total time the target 301 is visible to the observer robot 303—as an alternative to maximizing the escape time. For example, as shown in FIG. 2, the exposure of the observer robot 103 to the target 101 roughly corresponds to the observer robot's positions 103a–103c.

If the tracking strategy u*(t) is computed as a function of the state x(t), then the strategy operates in a closed loop. Otherwise, the tracking strategy runs in open loop. Closed-loop strategies are typically preferred over open-loop ones even for the predictable case, unless there is a guarantee that the target's motion models and position measurements are exact.

When the target's actions are unknown, the target 301 is said to be "unpredictable" and solution to the problem becomes more complicated. FIGS. 2 and 3 both illustrate the movement of unpredictable targets. The unpredictable case can be analyzed in two ways. If the target actions are modeled as "non deterministic uncertainty," then it is assumed that $\Theta$ is known but not a specific $\theta(t) \epsilon \Theta$. Thus, the action set is known but not the specific action selected by the target 301 at any instance. In this case, a tracking strategy can be designed that performs the best given the worst-case choices for $\theta(t)$. Alternatively, if a "probabilistic uncertainty" model is available (e.g., the probability density function $p(\theta(t))$ is known), then it is possible to compute a motion plan that is the best in the expected sense.

Computation of Escape Paths Using a Ray-Sweep Algorithm

Recall that $V(q^o)$ is the set of all locations where the target (e.g., the target 301 shown in FIG. 3) is visible to an observer robot (e.g., the observer robot 303 shown in FIG. 3). Suppose $V(q^o)$ is represented by a list of vertices ordered counter-clockwise. The contents of this list may be split into the lists $L_l$ and $L_r$, where $L_l$ is the list of all vertices of $V(q^o)$ to the left of $l(q^o, q^t)$, and $L_r$ is the list of all vertices to the right of $l(q^o, q^t)$. The order of $L_r$ can be reversed so that its contents are ordered clockwise. Accordingly, a ray-sweep algorithm comprises computing the shortest path from $q^t$ to the every vertex in $V(q^o)$ by performing a sequential scan of $L_l$ followed by a similar scan on $L_r$.

Here is a representative scan for $L_l$. The algorithm visits each $v_i \epsilon L_l$ and updates a pivot list $\pi_i$, the list of vertices that define the shortest path from $q^t$ to $v_i \epsilon L_l$. The update operation performed by the algorithm could operate as follows:

Pivot List Update:
Repeat until size_of $(\pi_i) < 3$ or Step 2 fails:
1. Let $u_{r-1}$, $u_r$, and $u_{r+1}$ be the last 3 elements of $\pi_i$, with $u_{r+1} = v_i$
2. If $u_{r+1}$ lies to the right of the line $(u_{r-1}, u_r)$, then remove $u_r$ from $\pi_i$.

The ray-scan algorithm exploits the fact that once a vertex is no longer a member of an escape path, it will not become one again. This is a consequence of Theorem 1 discussed below.

A path shortest escape path $SEP(q^t, e)$ is computed from a pivot list $\pi_i$, at the currently visited vertex $v_i$. There are three mutually exclusive cases for $v_i$ and the algorithm acts differently in each case:

1. If $v_i$ isn't in a free edge then $\pi_i$, is not an escape path.
2. If $v_i$ is an endpoint of a free edge and the segment $(v_{i-1}, v_i)$ is an obstacle edge, then $\pi_i$ representing a new escape path $SEP(q^t, e)$.

3. If $v_i$ is an endpoint of a free edge, but the segment $(v_{i-1}, v_i)$ lies in free space, then it might be possible to shorten the newly-found escape path by displacing the escape point along the free edge preceding $v_i$. This can be easily calculated in a constant time.

Run-Time Analysis

For efficient operation, each vertex in $L_1$ and $L_r$ is appended to the pivot list exactly once, according an embodiment of the invention. Similarly, each removed vertex is not reinserted into the list. Hence, if the input list representing $V(q^o)$ is pre-sorted, the computational cost of the ray-sweep algorithm is proportional to the number of vertices stored in $L_1$ and $L_r$. The cost for computing all the escape paths is that O(n). This is also the cost for computing the escape-path tree, since each node in the tree is a vertex in $V(q^o)$.

Escape-Path Tree

In a line-of-sight visibility model, the region $V(q^o)$ inside a polygonal workspace is also a polygon (in fact, the polygon is typically a star polygon). This visibility polygon has linear complexity and its boundaries are composed of solid and free edges. A solid edge represents an observed section of the workspace (e.g., it is part of a physical obstacle). A free edge e is caused by an occlusion, and it is contained inside the workspace (e.g., it is an element of $C_{free} \subseteq W$).

Suppose that the target 301 is visible to the observer robot 303. In other words, $q^t \epsilon V(q^o)$). An "escape path" for a target 301 located at $q^t$ is any collision-free path connecting $q^t$ to a point in W outside $V(q^o)$. For example, an escape path for the target 301 is to place obstacle 111, or an occlusion created by obstacle 111, between it and the observer robot 303. The "escape point" of the escape path is the point where the path intersects the boundary of $V(q^o)$, which always occurs along a free edge. Of course, there exists an infinite number of escape paths for a particular configuration of target 301 and observer robot 303. However, for a particular escape point, there exists a path of minimal length between the escape point and the target. Moreover, for any free edge e, there exists an escape path of minimal length among all escape points along that edge. Such a path $SEP(q^t, e)$ is called the target's "shortest escape path" through the free edge e. The length of $SEP(q^t, e)$ is the shortest distance to escape through e $(SDE(q^t, e))$.

The shortest time in which the target 301 may traverse an escape path is the "escape time" for that path. For any free edge e and a target location $q^t$, there exists a path of minimal escape time, and in general this is not equal to the $SEP(q^t, e)$. These two paths are equivalent only if the target is holonomic and has negligible inertia. The term $t_{esc}(q^t, q^o)$ denotes the minimum escape time along all escape paths leaving $V(q^o)$ and originating in $q^t$.

Given $q^t \epsilon V(q^o)$, the tracking algorithm can compute SEP $(q^t, e) \forall e$ bounding $V(q^o)$. Thus, if $V(q^o)$ is bounded by $n_f$ free edges, there are $n_f$ "shortest" escape paths. The shortest $SEP(q^t, e)$ over all e bounding $V(q^o)$ is the shortest escape path $SEP(q^t, q^o)$ for the configuration $(q^t, q^o)$. Its length is $SDE(q^t, q^o)$. If the target is holonomic and has negligible inertia then $SDE(q^t, q^o)$ equals $t_{esc}(q^t, q^o)$ multiplied by the target's maximum speed.

Properties of Escape Paths

Suppose $q^t \epsilon V(q^o)$ and let $l(q^t, q^o)$ be the line passing through the target and the observer robot. For polygonal workspaces, and assuming the target is a point, the path $SEP(q^t, e)$ satisfies the following basic properties:

Property 1: $SEP(q^t, e)$ is a polygonal line connecting $q^t$ to a point in a free edge e bounding $V(q^o)$. Each vertex of this polygonal line, if any, is a vertex of $V(q^o)$.

Property 2: The path SEP($q^t$, e) cannot strictly cross the radial line $l(q^t, q^o)$. The path either lies fully on a single singe (right or left) of $l(q^t, q^o)$ or is contained in $l(q^t, q^o)$.

Property 3: The path SEP($q^t$, e) cannot strictly cross any radial line $l(q^o, v) \forall v \in V(q^o)$ more than once.

Let $L_1$ be the list of vertices of $V(q^o)$ that lie to the left of $l(q^t, q^o)$, sorted in counter-clockwise order. Similarly, define $L_r$ as the list of vertices of $V(q^o)$ to the right of $l(q^t, q^o)$, sorted in clockwise order. If $l(q^t, q^o)$ passes through a vertex of $V(q^o)$, then let this vertex be included in both $L_1$ and $L_r$.

The next theorem is the basis for the ray-sweep algorithm described above:

Theorem 1: If the shortest path from $q^t$ to an obstacle vertex v in $L_1$ (or $L_r$) does not pass through a previous vertex u in $L_1$ (or $L_r$), then neither the shortest path from $q^t$ to any vertex w appearing after v in $L_1$ (or $L_r$) passes through u.

Proof: If the shortest path from $q^t$ to w passes through u, then the shortest path from $q^t$ to v will intersect the shortest path from $q^t$ to w at a point other than $q^t$. Therefore, one of the two paths could be made shorter.

Theorem 1 implies that SEP($q^t$, e) can be constructed incrementally with a ray-sweep algorithm, such as the algorithm described above. It is only necessary to remember the shortest path from $q^t$ to the most recently visited obstacle vertex during the scanning of $L_1$ (or $L_r$).

Escape-Path Trees

Observation of an escape-path tree shows that many paths share the same initial structure. This property reveals a fundamental problem with a strategy that minimizes the average distance over all paths SEP($q^t$, e). Escape paths along the same branch are over-represented by taking the global average at the expense of solitary escape paths. This is often the case in an actual implementation, where chairs, table legs, and similar small obstacles produce many escape paths along the same branch. This problem can be lessened by computing a recursive average from the escape-path tree's children backwards into the parent node. Children of the same node are first averaged between each other, and the result is then back-propagated to the previous node.

Tracking by Minimizing the Escape Risk

Solving the target tracking problem can be computationally expensive, especially in a small robot. In practice, it is often useful to employ strategies that plan for a small time horizon $\Delta t$ in order to provide a sufficiently fast algorithm. Accordingly, suitable algorithms comprise discretizing the problem in stages of some small duration $\Delta t$. For a give stage k, the algorithm finds a control action $u_k$ for the observer robot by solving the following equation:

$$u_k^* \leftarrow \text{maximizing value of } t_{esc}(q_{k+1}^o(q_k^o, u_k), q_k^t) \text{ over all } u_k \text{ in } U,$$

where the target is assumed to remain at the same location until the next stage calculation, e.g., the acquisition of a next visibility region. A key to the equation above is the calculation of $t_{esc}$. This can be a computationally expensive calculation.

For any target under kino-dynamic constraints, $t_{esc}$ is upper bounded by a factor proportional to the SDE, which is a lot easier to compute. The following equation approximates the equation above by solving:

$$u_k^* \leftarrow \text{maximizing value of } SDE(q_{k+1}^o(q_k^o, u_k), q_k^t) \text{ over all } u_k \text{ in } U,$$

which essentially uses the SDE as a proxy function of the escape time. In practice, this strategy typically produces poor results in all but simulated experiments and holonomic observers without dynamics. There are two problems with the equation above. One is due to the nature of the SDE function. As the observer robot moves, new occlusions form and old ones disappear, and new escape paths become the shortest escape path. As a result, the value of $u_k^*$ can change abruptly from one state to the next producing a shattering effect on the control signal. Un-modeled observer robot dynamics will be excited by a shattering signal, producing very erratic and unpredictable motions in the observer robot. The second problem is that the SDE is not a good proxy function for $t_{esc}$. The relationship between SDE and $t_{esc}$ is not linear. In fact, a large SDE makes it increasingly harder for the target to escape. To understand this, imagine a situation where the SDE becomes increasingly larger. Tracking becomes easier not only because the target has to travel a longer distance in order to escape, but also because the observer robot has time to improve its ability to track the target in the future. Both problems associated with the second equation above can be solved by using the following proxy function for $t_{esc}$. This function is the "escape risk," defined for every free edge e as follows:

$$\phi^e = cr_o^2 f(1/h),$$

where $h = \text{SDE}(e, q^t)$ is the shortest distance between the target and the edge e, $r_o$ is the distance from the observer robot ($q^o$) to the corner causing the occlusion at e, d is the distance between the target ($q^t$) to said corner, $c > 0$ is a constant and $f(1/h)$ is a monotonically increasing function of $1/h$. The term $cr_o^2$ is the "look-ahead" component because its minimization increases the future ability of the observer robot to track. The term $f(1/h)$ is the "reactive" component because its minimization decreases the likelihood that the target escapes the current visibility region. The functions $\log(1/h^2 + 1)$ and $(1/h)^{m+2}$ (for a non-negative integer m) are examples of $f(1/h)$.

Applications of the Tracking Algorithm

Many applications may benefit from robots having mobile sensors that employ embodiments of the invention. Observer robots employing the invention can autonomously monitor targets moving unpredictable in environments cluttered by obstacles. For example, a robot equipped with a camera, known as an autonomous observer ("AO") can assist geographically distributed teams debug robotic software. The AO continuously tracks a second robot (the target) executing an independent task. The information acquired by the AO is supplied to remote workstations where a three-dimensional graphic rendering of the target and its environment allows the programmers to detect and correct bugs in the target's software.

Target-tracking techniques in obstacle-laden environments can also be employed for the graphic animation of digital actors to select the successive viewpoints (positions of a virtual camera) under which an actor is to be displayed as it moves in its environment. Controllable cameras employed in surgery could keep a patient's organ or tissue under continuous observation, despite unpredictable motions of potentially obstructing people or instruments.

In an airport environment, mobile robots available to travelers for carrying bags could autonomously follow the movements of the travelers as they move through the airport. The military domain offers multiple uses for tracking targets among obstacles. A key distinction between these applications and some conventional tracking applications (e.g., missile control and pure visual tracking) is the introduction of obstacles that occlude the field of view of the sensor and obstruct the motions of the sensor and the target. The sensor needs to use its ability to move to prevent undesirable occlusions from occurring.

The track algorithm can also be used to map new environments for other robots. For example, the track algorithm could be used in a robot assigned to explore new environments. In a simple office example, an observer robot having the track algorithm could be assigned to follow a target throughout an office floor, mapping the floor as it follows the target. This map could then be supplied to direct robots assigned to perform various tasks on the floor. The observer robot could even be supplied with multiple sensors, such as a low-resolution sensor whose data provided the visibility regions for the observer robot's navigation and a high-resolution sensor that rendered detailed maps of the floor plan as the observer robot traversed the floor. The detailed maps could then be provided to the follow-on robots whose navigation could be controlled by other algorithms.

The tracking algorithm may be included in any type of mobile robot, including an anthropomorphic human robot such as the Honda ASIMO robot. Additionally, neither the sensor(s) whose data ultimately provides the visibility region, nor the track algorithm itself, necessarily needs to reside on the observer robot, provided the tracking commands can be supplied (e.g., transmitted) to the observer robot, according to an embodiment of the invention.

These and other changes can be made to the invention in light of the above detailed description. In general, in the following claims, the terms used should not be construed to limit the invention to the specific embodiments disclosed in the specification and the claims, but should be construed to include all systems and methods that operate under the claims set forth hereinbelow. Accordingly, the invention is not limited by the disclosure.

What is claimed is:

1. A method for tracking a target moving among a plurality of obstacles in a workspace, comprising:
   preparing a visibility region that identifies locations of obstacles from the plurality of obstacles and identifies a location of the target using data received from a sensor;
   calculating a plurality of escape paths for the target using the visibility region, each escape path representing a route that would occlude the target from detection by the sensor;
   identifying an escape path set from among the plurality of escape paths such that the escape path set represents routes of shortest length from among the plurality of escape paths; and
   calculating an escape risk and an escape risk gradient for the escape path set.

2. The method of claim 1, further comprising:
   preparing a motion command using the escape risk gradient for an observer robot following the target.

3. The method of claim 2 wherein preparing the motion command further comprises:
   calculating a recursive average of the escape risk gradient.

4. The method of claim 1 wherein calculating a plurality of escape paths further comprises:
   identifying occlusion regions created by obstacles of the plurality of obstacles, an occlusion region comprising an area in which the sensor cannot detect the target.

5. The method of claim 1 wherein calculating a plurality of escape paths for the target using the visibility region further comprises applying a computer-implemented ray-sweep algorithm to identify the escape paths.

6. A method for tracking a target in a workspace, comprising:
   sensing the workspace to obtain a visibility region that identifies the target and at least one obstacle;
   calculating an escape risk gradient using the visibility region that a trajectory of the target will escape detection from an observer robot, escape from the observer robot including movement outside the visibility region and movement into an occlusion produced by the at least one obstacle; and
   composing a steering command for the observer robot using the escape risk gradient, the steering command reducing the target's ability to escape detection from the observer robot.

7. The method of claim 6 wherein calculating the escape risk, further comprises minimizing the escape risk by calculating a reactive term to compensate for the trajectory of the target with respect to a plurality of escape paths and calculating a look-ahead term that compensates for distance between the observer robot and the at least one obstacle.

8. The method of claim 6 wherein the escape risk calculation for each free edge in the visibility region is performed by executing a formula:

$$\phi^e = cr_o^2 f(1/h),$$

where c is a positive constant, h is a shortest distance between the target and an occlusion between the observer robot and the target, $r_o$ is the distance from the observer robot to an obstacle that could cause an occlusion, and $f(1/h)$ is a monotonically increasing function of $1/h$.

9. The method of claim 6, further comprising:
   calculating a plurality of escape risks for the visibility region; and
   calculating an escape risk gradient for the plurality of escape risks.

10. The method of claim 9 wherein composing the steering command for the observer robot using the escape risk comprises:
    calculating a recursive average of the escape risk gradient.

11. A method for tracking a target moving in a workspace, comprising:
    preparing an escape-path tree having the target as a head node;
    identifying a plurality of escape paths for the target, each escape path representing a route through the workspace that would occlude the target from at least one sensor;
    placing each escape path of the plurality of escape paths as a child node in the escape-path tree, ordering each escape path in the escape-path tree such that escape paths having shorter lengths reside higher in the escape-path tree than escape paths having longer lengths;
    selecting a set of escape paths having shorter lengths from the escape-path tree; and
    calculating an escape risk for the target using the set of escape paths.

12. The method of claim 11 wherein identifying the plurality of escape paths for the target further comprises applying a computer-implemented ray-sweep algorithm to identify the escape paths.

13. The method of claim 11 wherein calculating the escape risk calculation for every free edge e in the visibility region comprises executing a formula:

$$\phi^e = cr_o^2 f(1/h),$$

where c is a positive constant, h is a shortest distance between the target and an occlusion between the observer robot and the target, $r_o$ is the distance from the observer robot to an obstacle that could cause an occlusion, and $f(1/h)$ is a monotonically increasing function of $1/h$.

14. The method of claim 11, further comprising:
calculating a plurality of escape risks; and
calculating an escape risk gradient for the plurality of escape risks.

15. The method of claim 14, further comprising:
preparing a motion command using the escape risk gradient for an observer robot following the target.

16. A system for tracking a target moving among a plurality of obstacles in a workspace, comprising:
a visibility acquisition module configured to prepare a visibility region that identifies locations of obstacles from the plurality of obstacles using data received from a sensor;
a target acquisition module configured to locate the target in the visibility region;
an escape-path tree building module configured to identify a plurality of escape paths for the target using the visibility region, each escape path representing a route that would occlude the target from detection by the sensor;
a shortest escape-path tree calculation module configured to identify an escape path set from among the plurality of escape paths such that the escape path set represents routes of shortest length from among the plurality of escape paths; and
a risk gradient calculation module configured to calculate an escape risk gradient for the escape path set.

17. The system of claim 16, further comprising:
a motion command calculation module configured to compose a steering command for the observer robot using the escape risk gradient, the steering command reducing the target's ability to escape detection from the sensor.

18. The system of claim 16 wherein the risk gradient calculation module is configured to calculate the escape risk gradient for the escape path set by executing an operation over a risk function associated to every edge e in the visibility region, the operation being given by:

$$-\nabla \phi^e = 2cr_o f'(1/h) + c(r_o/h)^2 f'(1/h) \nabla h,$$

where $f'(1/h)$ is the mathematical derivative of $f(1/h)$, and $\nabla h$—the gradient of h—is calculated according to the geometry of the escape path SEP(e, q$^r$) associated to the edge e. In the above equation, c is a positive constant, h is the shortest distance between the target and an occlusion between the target and an observer robot tracking the target, and $r_o$ is the distance from the observer robot to an obstacle that could cause the occlusion.

19. The system of claim 16 wherein the escape-path tree building module identifies the plurality of escape paths for the target by executing a computer-implemented ray-sweep algorithm.

20. A system for tracking a target in a workspace, comprising:
a sensor configured to obtain data that describes the workspace;
a visibility region acquisition module configured to use data received from the sensor to produce a visibility region that identifies a plurality of obstacles in the workspace;
a target acquisition module configured to identify the target in the workspace;
a risk association module configured to use the visibility region to determine an escape risk that the target will escape detection from an observer robot, escape from the observer robot including target movement outside the visibility region and target movement into an occlusion produced by at least one obstacle of the plurality of obstacles; and
a motion command calculation module configured to compose a steering command for the observer robot using the escape risk, the steering command reducing the target's ability to escape detection from the observer robot.

21. The system of claim 20, further comprising:
a risk gradient calculation module configured to calculate an escape risk gradient using the escape risk determined by the risk association module and provide the escape risk gradient to the motion command calculation module for preparation of the steering command.

22. The system of claim 21 wherein the risk gradient calculation module is configured to calculate the escape risk gradient by executing an operation over a risk function associated to every edge e in the visibility region, the operation being given by:

$$-\nabla \phi^e = 2cr_o f'(1/h) + c(r_o/h)^2 f'(1/h) \nabla h,$$

where $f'(1/h)$ is the mathematical derivative of $f(1/h)$, and $\nabla h$—the gradient of h—is calculated according to the geometry of the escape path SEP(e, q$^r$) associated to the edge e. In the above equation, c is a positive constant, h is the shortest distance between the target and an occlusion between the target and an observer robot tracking the target, and $r_o$ is the distance from the observer robot to an obstacle that could cause the occlusion.

23. The system of claim 20 wherein the observer robot is attached to the sensor.

24. The system of claim 20 wherein the observer robot is an anthropomorphic robot and the motion command calculation module prepares the steering command for execution by anthropomorphic actuators.

25. The system of claim 20 wherein the target is a mammal and the sensor is configured to acquire heat-related data that describes the workplace.

26. A system for tracking a target moving in a workspace, comprising:
an escape-path tree building module configured to prepare an escape-path tree having the target as a head node; identify a plurality of escape paths for the target, each escape path representing a route through the workspace that would occlude the target from at least one sensor; place each escape path of the plurality of escape paths as a child node in the escape-path tree, order each escape path in the escape-path tree such that escape paths having shorter lengths reside higher in the escape-path tree than escape paths having longer lengths;
a shortest escape-path tree calculation module configured to select a set of escape paths having shorter lengths from the escape-path tree; and
a risk association module configured to calculate an escape risk for the target using the set of escape paths.

27. The system of claim 26, further comprising:
a data repository configured to retain the escape-path tree.

* * * * *

UNITED STATES PATENT AND TRADEMARK OFFICE
CERTIFICATE OF CORRECTION

PATENT NO. : 6,917,855 B2
DATED : July 12, 2005
INVENTOR(S) : Hector Gonzalez-Banos et al.

It is certified that error appears in the above-identified patent and that said Letters Patent is hereby corrected as shown below:

Title page,
Item [75], Inventors, "Cheng-Yu Lee", delete "Stanford" and insert -- Palo Alto --; and "Jean-Claude Latombe", delete "Stanford" and insert -- Palo Alto --.

Column 22,
Line 25, delete "$-\nabla\phi^e = 2cr_o f'\ (1/h) + c(r_o/h)^2 f'(1/h)(\nabla h$" and insert -- $-\nabla\phi^e = 2cr_o f(1/h) + c(r_o/h)^2 f'(1/h)\nabla h$ --.
Line 26, delete "*f(1/h)* is the mathematical derivative of *f(1/h)*" and insert -- *f'(1/h)* is the mathematical derivative of *f(1/h)* --.

Signed and Sealed this

Twenty-fifth Day of October, 2005

JON W. DUDAS
*Director of the United States Patent and Trademark Office*